(12) United States Patent
Tanaka

(10) Patent No.: US 7,642,620 B2
(45) Date of Patent: Jan. 5, 2010

(54) SEMICONDUCTOR APPARATUS

(75) Inventor: Akio Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1473 days.

(21) Appl. No.: 10/459,524

(22) Filed: Jun. 12, 2003

(65) Prior Publication Data

US 2003/0230733 A1   Dec. 18, 2003

(30) Foreign Application Priority Data

Jun. 14, 2002   (JP)   ............. 2002-174432

(51) Int. Cl.
*H01L 27/00* (2006.01)
(52) U.S. Cl. .............. 257/536; 257/E27.011; 257/E27.016; 257/E27.024; 257/E27.143; 257/E25.004; 307/25; 307/28; 307/29; 365/189.11
(58) Field of Classification Search ........... 327/308, 327/530, 538, 407; 438/121; 257/536, E27.011, 257/E27.016, E27.024, E27.025, E27.143, 257/E25.004; 307/28, 43, 63, 65, 72, 75, 307/80, 85, 112, 125; 326/62, 80; 365/189.11
See application file for complete search history.

(56) References Cited

U.S. PATENT DOCUMENTS 5,194,761 A * 3/1993 Smith ................ 327/306
6,738,289 B2 * 5/2004 Gongwer et al. ....... 365/185.12

FOREIGN PATENT DOCUMENTS

| JP | 6-189199 | 7/1994 |
|---|---|---|
| JP | 6-189204 | 7/1994 |
| JP | 7-104716 | 4/1995 |
| JP | 8-82783 | 3/1996 |
| JP | 8-139365 | 5/1996 |
| JP | 8-184811 | 7/1996 |
| JP | 9-65209 | 3/1997 |
| JP | 10-148570 | 6/1998 |
| JP | 2001-4401 | 1/2000 |
| JP | 2000-114467 | 4/2000 |
| JP | 2000-165748 | 6/2000 |
| JP | 2001-44837 | 2/2001 |
| JP | 2001-245222 | 9/2001 |
| JP | 2002-140041 | 5/2002 |

OTHER PUBLICATIONS

W. J. Parish et al., "Low Cost 160×128 uncooled infrared sensor array", pp. 111-118, Apr. 1998.

* cited by examiner

*Primary Examiner*—Matthew Smith
*Assistant Examiner*—Julio J Maldonado
(74) *Attorney, Agent, or Firm*—Young & Thompson

(57) ABSTRACT

It is an object of the present invention to provide a semiconductor apparatus for solving a trade-off between the area, power consumption, noise and accuracy of correction of a variation correction circuit that corrects variations in resistance and threshold voltage, etc. The present invention comprises a multi-value voltage generation circuit shared by a plurality of reading circuits, a multi-value voltage bus that supplies multi-value voltages to the reading circuits and switches that select a voltage suited to variation correction from multi-value voltages, wherein the multi-value voltages are distributed from the multi-value voltage generation circuit to the plurality of reading circuits, the switches select an optimum voltage for correction in the respective reading circuits to thereby correct variations in the elements.

23 Claims, 20 Drawing Sheets

SEMICONDUCTOR APPARATUS

BACKGROUND OF THE INVENTION

1. Field of the Invention

The present invention relates to a semiconductor apparatus and, more particularly, to a circuit that corrects variations in various elements in a semiconductor apparatus and variations in characteristics due to the variations in the elements.

2. Description of the Related Art

Examples of variations in elements of a semiconductor apparatus include variations in resistance or capacitance of a resistor or capacitor, threshold voltage Vt or ON-current of a transistor, base-emitter voltage Vbe of a bipolar transistor, resistance, capacitance, sensitivity or offset voltage of various sensor elements.

Variations in these elements cause characteristics of a circuit to change. For example, these characteristics include offset voltage, sensitivity, speed, output current, etc.

The following explanations will be focused on an infrared imaging device, but the present invention is applicable to any semiconductor apparatus capable of improving characteristics by correcting variations.

An example of a circuit that corrects variations in elements of a semiconductor apparatus is a semiconductor apparatus proposed in Japanese Patent Application Laid-Open No. 2000-114467 (hereinafter referred to as "Document 1") by the inventor of the present invention. As shown in FIG. 19, this semiconductor apparatus includes a bolometer 1601 that converts incident infrared radiation to an electric signal, a transistor 1602 that applies a constant voltage to the bolometer 1601 and converts a resistance variation of the bolometer 1601 to a current variation, a capacitor 1603, one end of which is connected to the collector of the transistor 1602 and the other end of which is grounded, for integrating variations in the current that flows through the transistor 1602 and a variation correction circuit 1604 that corrects variations among a plurality of the bolometers 1601. The bolometers are arrayed two-dimensionally and bolometer signals corresponding to one column (V1 to Vn) in vertical direction are read by one reading circuit 1605 and all pixels are read by providing one reading circuit for each column (H1 to Hn). In FIG. 19, reference numeral 1609 denotes a bias circuit that supplies a bias voltage to a transistor of a cancellation circuit 1607, 1613 denotes a bias circuit that gives a bias to the bolometers and 1614 denotes a bias circuit that gives a bias voltage to the variation correction circuit 1604.

A certain reading circuit 1605 needs to correct and read variations of the bolometers of V1 to Vn and the variation correction circuit 1604 carries out corrections by changing its current value from one bolometer to another.

The variation correction circuit 1604 includes a plurality of current sources 1606 and current values of the current sources 1606 are arranged in binary form from MSB (most significant bit) to LSB (least significant bit) by sequentially changing two times each value. By changing current sources to be turned on by the bolometers 1601, it is possible to correct current variations due to resistance variations of the bolometers 1601.

Furthermore, an example of an imaging device disclosed in Japanese Patent Application Laid-Open No. 2000-004401 (hereinafter referred to as "Document 2") includes reading circuits 1605 similar to those in FIG. 19, but corrects variations using the bias cancellation circuit 1607 instead of using the correction circuits 1604.

The bias cancellation circuit 1607 is usually used to cancel a bias component of a bolometer current and store only a signal component in a capacitor.

The imaging device disclosed in Document 2 configures resistance of this bias cancellation circuit 1607 (see FIG. 19) with a plurality of resistors that vary in binary form, thus allowing the bias cancellation circuit itself to have a variation correction function. That is, the bias cancellation circuit (bias current cancellation circuit) in Document 2 adopts a configuration comprising an FPN correction memory, a group of switches ON/OFF-controlled by digital data output from the FPN correction memory, one ends of which are commonly connected to a power supply and a group of resistors, one ends of which are connected to the other ends of the plurality of switches and the other ends of which are commonly connected to the collector of the transistor of the bias cancellation circuit 1607.

Furthermore, according to an example disclosed in Document 3 ("Low Cost 160×128 uncooled infrared sensor array", SPIE Vol.3360 Part of the SPIE Conference on Infrared Readout Electronics IV April.1999), a bias voltage is supplied through a transistor to detect resistance variations of bolometers and variations in currents flowing through the bolometers are detected as a voltage by allowing an integrating circuit to integrate them using an operational amplifier. Then, the output of the integrating circuit is subjected to sample and hold. The integration operation and sample-and-hold operation are carried out by a plurality of reading circuits simultaneously. The proposal then describes that the sample-and-hold outputs of the respective reading circuits are multiplexed sequentially and output to the outside.

As shown in FIG. 20, according to the technique disclosed in above-described Document 3, a bolometer 1701 is connected to the source of a P-channel MOSFET (hereinafter referred to as "PchMOSFET") 1702 through a switch and the gate of the PchMOSFET 1702 is connected to the output terminal of a digital/analog converter (hereinafter referred to as "D/A converter") 1703. Furthermore, a bolometer 1705, which is thermally short-circuited, is connected to the source of an N-channel MOSFET (hereinafter referred to as "NchMOSFET") 1704 and the gate of the NchMOSFET 1704 is connected to the output terminal of a D/A converter 1706. The connection point of the drain of the PchMOSFET 1702 and the drain of the NchMOSFET 1704 is connected to an integrator 1707 and a displacement current due to incident infrared radiation of the bolometer 1701 is converted to an integrated voltage by an integrating capacitor 1708.

Furthermore, an integrating circuit 1712 is constructed of the integrator 1707, the integrating capacitor 1708 and a reset switch 1709, and the integrating capacitor 1708 is periodically reset by the reset switch 1709. The integrator 1707 is made up of an OP amp (operational amplifier), the non-inverting input terminal of which is grounded and the inverting input terminal of which is connected to the input terminal of the integrating circuit 1712, with a parallel circuit of the capacitor 1708 and switch 1709 inserted between the inverting input terminal and a feedback path of the output terminal.

A sample-and-hold circuit (hereinafter referred to as "S/H circuit") 1710 carries out sample and hold on the output voltage of the integrating circuit 1712 and multiplexer switches 1711 output the outputs of reading circuits 1713 to the outside sequentially. According to this document, there are nine reading circuits 1713.

However, the present inventor has noticed that the above-described conventional variation correction circuit has the following problems:

First, there is a trade-off between the area of the variation correction circuit and noise generated from the variation correction circuit. For example, in the example shown in above-described Document 1, current-related noise of the variation correction circuit is reduced as the resistance of the current source 1606 increases and the volume of the resistor increases. This is because:

The current-related noise of the resistor is inversely proportional to resistance.

The 1/f noise of the resistor is inversely proportional to the volume.

There is normally a demand for making noise of the variation correction circuit smaller than noise of the bolometer and there is a need to increase the resistance of the current source 1606 and increase the volume of the resistor.

In addition, since there is also a need to sequentially increase the resistance in binary form from MSB to LSB twice at a time, the resistance of the LSB becomes extremely large, requiring a large area.

Second, there is a trade-off between power consumption and accuracy of correction. First, the example shown in above-described Document 1 requires another current that flows into the variation correction circuit 1604 in addition to the bolometer current. For this reason, further reduction of power consumption is preferred.

Furthermore, according to the configuration example described in above-described Document 1, the collector terminal of the current source 1606 (see FIG. 19) is connected to the capacitor 1603 and the collector terminal voltage changes together with an integration operation. For this reason, the current value of the current source 1606 varies subtly and it is susceptible to improvement in terms of linearity.

On the other hand, according to the example shown in FIG. 20 in above-described Document 3, since the drain of the transistor 1704 is controlled to a constant voltage by the operational amplifier 1707, there are few such problems, but there is a problem that power consumption of the D/A converters 1703 and 1706 that correct variations increases considerably.

Furthermore, the example shown in above-described Document 2 has relatively small current consumption but has a problem in terms of linearity as in the case of above-described Document 1.

Furthermore, the example of above-described Document 2 has a problem that the binary resistors arranged in parallel in the bias cancellation circuit cannot obtain sufficient accuracy of correction. Moreover, when resistors are used in series, there is also a problem that resistance becomes too small and the ON-resistance of switches, etc., grows to a noticeable level, failing to increase the accuracy of correction.

Third, the problems of the above-described area and power consumption make it difficult to apply the variation correction circuit to general LSIs such as a memory, cell-based IC and processor. With miniaturization technologies on the order of 100 nm in recent years, these LSIs have a problem that variations in threshold voltage Vt and ON-current of a transistor increase, which is accompanied by another problem that variations in an offset voltage of a sense amplifier or speed variations of a gate element become evident.

Therefore, it is a principal object of the present invention to provide a semiconductor apparatus capable of realizing a high accuracy variation correction function with low power consumption, low noise and a small area.

SUMMARY OF THE INVENTION

The semiconductor apparatus according to the present invention to attain the above-described object comprises a multi-value voltage generation circuit (117 in FIG. 1) used in a shared mode among a plurality of reading circuits, each of which reads variations in current that passes through resistors, a multi-value voltage bus (115 in FIG. 1) that supplies multi-value voltages to their respective reading circuits and a switch (113 in FIG. 1) that selects a voltage appropriate for correction of variations from the multi-value voltages.

According to the present invention, for example, one chip includes one or two multi-value voltage generation circuits and a plurality of different voltages output from the multi-value voltage generation circuits is supplied to a plurality of reading circuits through an analog voltage transmission bus. Inside each reading circuit, an optimum voltage for correction is selected by switching between output voltages by a switch.

The present invention having such a configuration not only attains particularly low power consumption but also realizes variations correcting means with a small area compared to a conventional circuit configuration.

Furthermore, the present invention improves the accuracy of correction by providing a plurality of lines of this multi-value voltage generation circuit and multi-value voltage bus.

For example, when there are two lines of m voltages and n voltages, it is possible to perform correction with the accuracy of m×n voltages and increase the accuracy of correction compared to the case of one line of m+n voltages.

In the present invention, the reading circuit includes an integrating circuit (103, 109 in FIG. 1) that inputs and integrates a current passing through a resistor array (101 in FIG. 1) and outputs the integration result, a first operational amplifier (105 in FIG. 1), the non-inverting input terminal of which is connected to the output terminal of a first switch (113) and the inverting input terminal of which is connected to one end of the aforementioned resistor array and a first transistor (104 in FIG. 1) connected between one end of the resistor array and the input terminal of the integrating circuit for receiving the output voltage from the output terminal of the first operational amplifier to its control terminal as a bias voltage. The reading circuit further includes a second multi-value voltage generation circuit (118 in FIG. 1) that supplies a plurality of different analog voltages to a plurality of lines constituting a second multi-value voltage bus (e.g., 116 in FIG. 1). The reading circuit is provided with a second switch (114 in FIG. 1) that inputs a plurality of different voltages output from the second multi-value voltage generation circuit to the aforementioned second multi-value voltage bus and selects and outputs one of those voltages, a second resistor (106 in FIG. 1), one end of which is connected to a second power supply, a second operational amplifier (108 in FIG. 1), the non-inverting input terminal of which is connected to the output terminal of the second switch and the inverting input terminal of which is connected to the other end of the above-described second resistor and a second transistor (107 in FIG. 1) connected between the other end of the second resistor (106) and the input terminal of the integrating circuit for receiving the output voltage from the output terminal of the above-described second operational amplifier (108) to its control terminal as a bias voltage.

The reading circuit according to the present invention is provided with a decoder (122 in FIG. 1) that controls the selection of the first switch (113) based on an input control signal.

The first multi-value voltage generation circuit according to the present invention is provided with a first amplifier (802) that amplifies an input reference voltage with a first gain, a second amplifier (803) that amplifies a reference voltage with a second gain and a plurality of resistors (804) connected in series between the output terminals of the above-described first and second amplifiers, and extracts a plurality of different output voltages from the output terminals of the first and second amplifiers, and from a plurality of taps made up of connection points of above-described plurality of resistors which are connected between the output terminals of the above-described first and second amplifiers.

The present invention can also adopt a configuration of correcting variations in elements by supplying the back gate voltage of the transistor with a voltage selected using a switch from a plurality of different voltages generated by the multi-value voltage generation circuit and supplied to the multi-value voltage bus. The semiconductor apparatus according to the present invention provided with such a variation correction function is implemented as a semiconductor apparatus such as a differential amplifier, memory sense amplifier, A/D (analog/digital) conversion circuit, communication circuit. That is, as is apparent from the following explanations, the above-described objects will be likewise attained by embodiments described in the scope of claims.

DETAILED DESCRIPTION OF THE PREFERRED EMBODIMENTS

With reference now to the attached drawings, embodiments of the present invention will be explained in detail below.

First Embodiment

Figure 1:
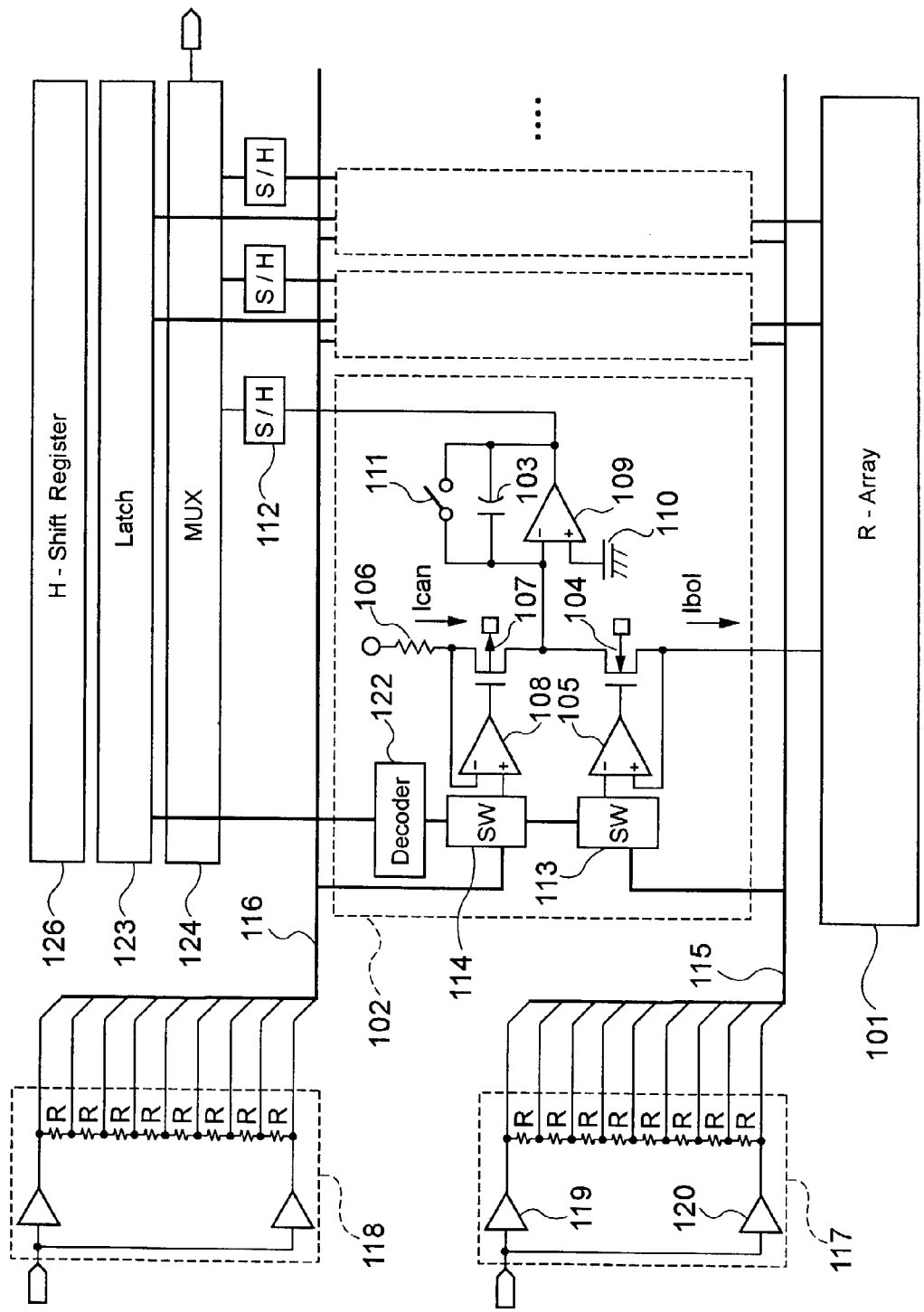
FIG. 1 illustrates a circuit configuration of a semiconductor apparatus showing an embodiment of the present invention.

FIG. 1 illustrates a configuration of a semiconductor apparatus according to a first embodiment of the present invention. According to FIG. 1, a resistor array 101. (R-Array) is a set of a plurality of resistors and consists of, for example, bolometers whose resistance changes depending on incident infrared radiation. Or it may also be made up of GRAM (Magnetic RAM) magnetic resistance elements using magnetic resistance effects. These resistors are arranged in two-dimensional matrix in row direction and column direction and a plurality of reading circuits 102 are arranged on its column side. The reading circuits 102 may be arranged one for each column or one for a plurality of columns. Operating the plurality of reading circuits 102 in parallel to carry out integration has the effect of securing a long integration time and reducing noise.

Increasing the number of reading circuits contributes to a reduction of noise, but has a trade-off relationship with aspects of power consumption and the area occupied. When noise in bolometers, magnetic resistance elements or circuits is limited to 1/f noise in particular, total noise may not be reduced even if bands are restricted by extending the integration time. In such a case, increasing the number of reading circuits is meaningless.

In the case of an infrared imaging device operating according to the NTSC (National Television System Committee) specification, the format of the resistor array 101 is constructed of bolometers with, for example, 320×240 pixels. One reading circuit 102 is formed for each of 320 columns on this column side. Or it is also possible to form one reading circuit 102 for every two columns of the resistor array 101, that is, 160 reading circuits 102.

A signal from the resistor array 101 is input to each reading circuit 102, a resistance variation is converted to a current variation and stored in the integrating capacitor 103.

This operation is an integration operation and assuming the time for storing charge in the integrating capacitor 103 is tint, the band (frequency) of the signal from the resistor array 101 is restricted to the band:

1/(2·tint)

As a circuit for converting a resistance variation to a current variation, the circuit in this example is provided with an N-channel MOS transistor (hereinafter referred to as "NMOS transistor") 104 and an operational amplifier 105. The source of the NMOS transistor 104 is connected to one end of the resistor array 101, the drain is connected to one end of the integrating capacitor 103 and the gate is connected to the output terminal of the operational amplifier 105. The inverting input terminal (−) of the operational amplifier 105 is connected to the source of the NMOS transistor 104. In such a configuration, the voltage applied to one end of the resistor array 101 becomes the voltage of the non-inverting input terminal (+) of the operational amplifier 105, which can control an applied voltage of the resistor array 101 accurately.

The circuit made up of a resistor 106, a P-channel MOS transistor (hereinafter referred to as "PMOS transistor") 107 and an operational amplifier 108 is normally called a "bias cancellation circuit" and functions to substantially balance the current (Ibol) flowing into the resistor array 101 side and the current (Ican) flowing into the bias cancellation side and thereby reduce the DC (direct current) current passing through the integrating capacitor 103 to a lowest possible level. This is because when the DC current flows into the integrating capacitor 103, there is a problem that the dynamic range of the circuit is occupied exclusively for the DC current, not for the signal to be originally amplified, failing to increase the integrating gain. The bias cancellation circuit solves this problem.

The integrating gain can be expressed:

tint/Cint where Cint is integrating capacitance and the integrating gain is multiplied by the current that flows in to become an output voltage.

Noise in the subsequent stages becomes less apparent as the integrating gain increases, providing the effect of improving input converted noise.

In this embodiment, one end of the integrating capacitor 103 is connected to the drain of the NMOS transistor 104 and further connected to the inverting input terminal of an operational amplifier 109. The other end of the integrating capacitor 103 is connected to the output terminal of the operational amplifier 109. The non-inverting input terminal (+) of the operational amplifier 109 is connected to a bias voltage 110.

This configuration in which the respective drains of the NMOS transistor and PMOS transistor are fixed to a certain bias voltage prevents the current (Ibol and Ican) flowing through the drains from being modulated by the drain voltage.

A reset switch 111 is connected in parallel between the terminals of the integrating capacitor 103. After a signal is integrated and read, the reset switch 111 turns on and the integrating capacitor 103 is reset.

The non-inverting input terminal (+) of the operational amplifier 105 is connected to a multi-value voltage generator 117 through a first switch 113 and a multi-value voltage bus 115.

The non-inverting input terminal (+) of the operational amplifier 108 is connected to a second multi-value voltage generator 118 through a second switch 114 and a second multi-value voltage bus 116.

The multi-value voltage generator 117 is a generator for generating a plurality of voltages and either a DC voltage or AC (Alternating Current) voltage can be used for the output voltage. What is important is that it generates a plurality of voltages in certain increments, for example, m different voltages. M voltages are distributed to a plurality of reading circuits 102 by the multi-value voltage bus 115.

The multi-value voltage bus 115 consists of m wires, which are connected to the plurality of reading circuits 102.

The switch 113 connected to the multi-value voltage bus 115 consists of m switches connected to m wires of the multi-value voltage bus 115 and selects one of m voltages. For example, the switch 113 turns off (m−1) switches and turns on one switch and selectively outputs the one voltage.

The non-inverting input terminal of the operational amplifier 105 is connected to the output terminal of the switch 113 and one of the plurality of voltages generated by the multi-value voltage generator 117 is supplied to its non-inverting input terminal through the switch 113, and this voltage is further supplied to the resistor array 101.

Likewise, the second multi-value voltage generator 118 generates, for example, n voltages and supplies one of the plurality of voltages to the non-inverting input terminal of the operational amplifier 108 and also supplies this voltage to the resistor 106 of the bias cancellation circuit.

A voltage to be supplied to the resistor array 101 is selected in such a way that variations in the current Ibol flowing into the resistor array 101 become smaller.

For example, when certain resistance of the resistor array 101 is Rbol and the voltage supplied thereto is Vbol, then, Ibol=Vbol/Rbol Selecting appropriate Vbol from a plurality of Vbol's according to variations in Rbol can reduce variations of Ibol even if Rbol varies drastically.

For example, as Vbol, suppose m voltages are generated in increments of ΔVbol.

The span of m×ΔVbol is set to a span that can cover resistance variations ΔRbol.

For example, suppose a voltage of LSB of Vbol (minimum voltage) is given to the smallest resistor in the resistor array 101 and the current that flows at that moment is a reference current Ibol0 of Ibol.

Selecting Vbol from a minimum to maximum according to resistance variations of the resistor array 101 makes sure that the current passing through each resistor substantially matches the reference current Ibol0.

For selection of this optimum Vbol, a bifurcated search method is normally used. For example, see Japanese Patent Application Laid-Open No. 2001-245222 (hereinafter referred to as "Document 4") which describes the procedure.

Properly, when a certain span voltage is determined, as the number m of voltage levels increases the voltage increment ΔVbol naturally becomes smaller and the accuracy of correction of current variations increases. Ideally, current variations are reduced down to 1/m by carrying out m-level correction compared to a case where no correction is performed.

The system of the second multi-value voltage generator 118 also performs the same operation as that described above. However, ordinary, variations of the resistor 106 can be made by far smaller than variations of the resistor array 101 and most of n voltages of the second multi-value voltage generator 118 can be used to correct current variations due to resistance variations of the resistor array 101.

Even if variations of the resistor 106 are large, this is no problem if a larger n as the number of levels is adopted accordingly.

The current that flows into the integrating capacitor 103 is a difference between the current of the system of the second multi-value voltage generator 118 and the current of the first system:

Ican−Ibol and the residual of Ibol variations that cannot have been corrected by the first system can be further corrected through correction of Ican by the second system.

Here, the numbers of voltages m and n may be the same or different.

What is important is that having a plurality of multi-value voltage generation systems in this way can increase the resolution of correction up to m×n levels in the case of two systems. For example, as described above, variations in Ibol due to resistance variations in the resistor array 101 are substantially reduced to 1/m by the system of the first multi-value voltage generator 117. This residual of 1/m is further reduced to 1/n by the system of the second multi-value voltage generator 118.

Thus, the same accuracy of correction as that when one m×n system is used can be obtained with m+n levels.

Generally, the voltage output from the first multi-value voltage generator 117 is different from that from the second multi-value voltage generator 118. However, both voltages can be completely the same in certain limited applications depending on the circuit configuration on the reading circuit 102 side or the specification required by the system. In this case, for the multi-value voltage generator and multi-value voltage bus, not more than one system is necessary, but for the switch, two systems are necessary.

The multi-value voltage generator 117 is constructed, for example, of a first voltage generator 119, a second voltage generator 120 and a resistor array 121. The first voltage generator 119 generates an upper voltage of the aforementioned voltage span and the second voltage generator 120 generates a lower voltage. The resistor array 121 can obtain any voltages over the span, used to divide the span. The resistor array 121 is preferably constructed of a plurality of resistors of the same resistance. The merit of this configuration, which will be described later, consists in the ability to easily generate not only a plurality of DC voltages but also a plurality of AC voltages.

The decoder 122 receives binary input data and carries out an operation for selecting one switch. For example, assuming that m=16 and there are 16 switches, 4-bit binary data is supplied from a memory or latch, etc., to the decoder 122. The decoder 122 receives the 4-bit data and selects one of 16 switches. It goes without saying that if there are two correction circuit systems, the two systems should be decoded.

The latch or memory 123 supplies binary data to the decoder 122. It is necessary to hand over correction data to the reading circuit 102 according to variations of the resistor array 101. There is a method of storing correction data in a memory outside the chip and read it to the latch on the chip or a method of forming a memory on the chip.

When the resistor array 101 is two-dimensional, the reading circuit of each column carries out a read operation for each row, and therefore when an external memory is provided, it is necessary to load data from the memory to the latch one row at a time.

The signal integrated by the integrating capacitor 103 is extracted from the output terminal of the operational amplifier 109 and handed over to sample-and-hold circuits 112. It is also possible to output a voltage between both ends of the integrating capacitor 103 as a signal.

A multiplexer 124 selects one of signals of the plurality of sample-and-hold circuits 112 and outputs the signal to an output terminal 125.

A shift register 126 is used to sequentially scan the multiplexer 124.

With the configuration of the embodiment shown in FIG. 1, it is only switches and decoder that are the circuits involved in correction of variations in each reading circuit 102, which reduces power consumption and circuit area drastically compared to the conventional configuration provided with a binary current source and A/D converter in the reading circuit.

As a comparative example, the conventional configuration using a current source is provided with a binary current source in each reading circuit and consumes a large amount of current.

Furthermore, using a resistor-current conversion circuit using an operational amplifier, this embodiment can accurately add voltages of high linearity precision to the resistor array and increase the accuracy of correction.

Furthermore, when multi-value voltages are generated or selected this embodiment can prevent additional noise from being added, and suppress noise to pure noise that exists in the resistor array, etc., and thereby drastically improve S/N (signal to noise ratio).

This is because it is possible to suppress thermal noise of the multi-value voltage generator, which will be described later, to an extremely small level and set thermal noise such as the switch 113 to a very small level.

In the conventional configuration which uses a binary current source as a comparative example, noise of the current source decreases as resistance increases. Furthermore, making thermal noise smaller than that of the resistor array requires the use of many resistors of a current source having by far greater resistance than that of the resistor array, which results in an enormous area of the resistors.

Second Embodiment

Figure 2:
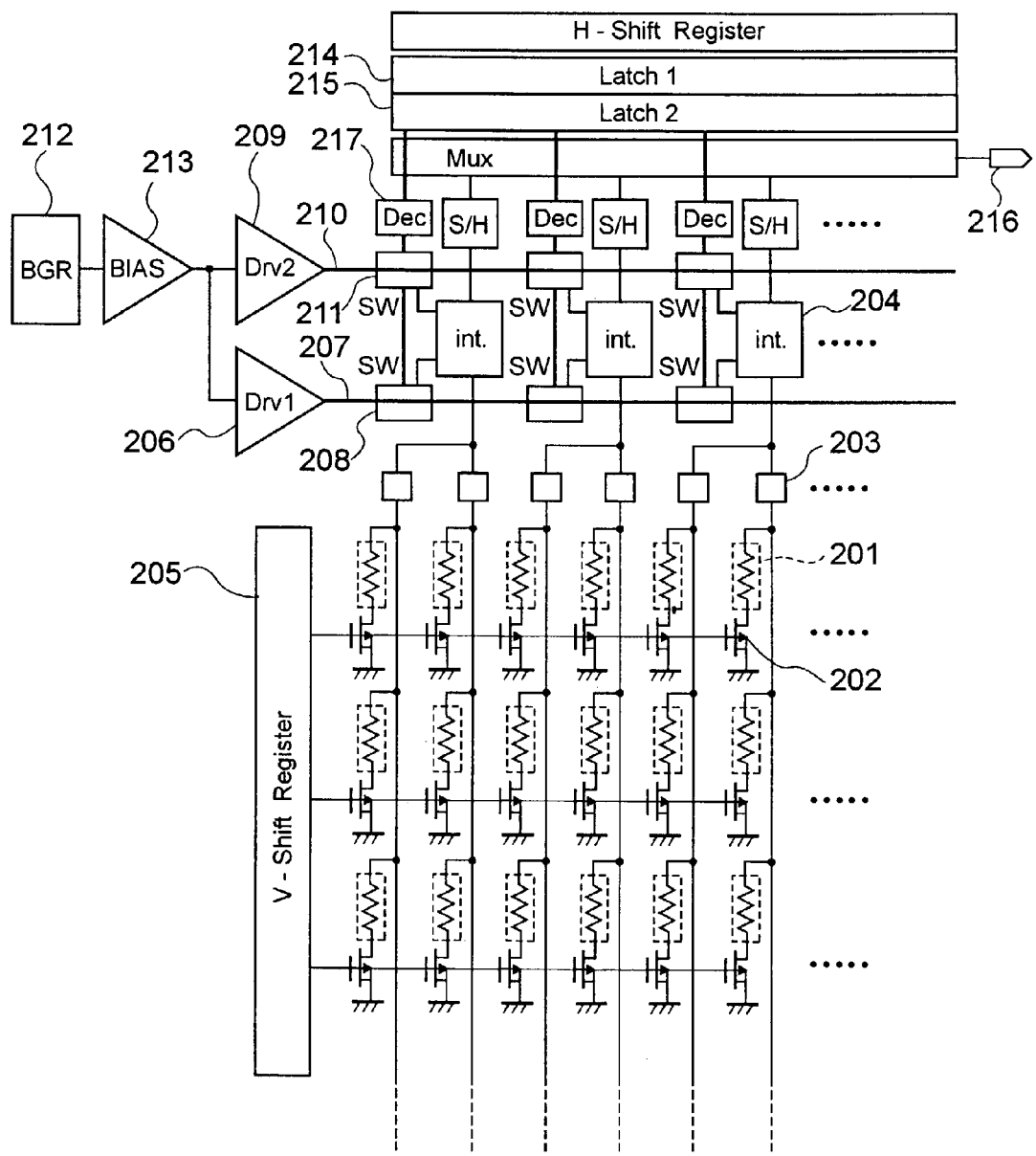
FIG. 2 illustrates a circuit configuration of an infrared imaging device according to the embodiment of the present invention.

Next, a second embodiment of the present invention will be explained. FIG. 2 illustrates a configuration of the second embodiment of the present invention. As in the case of the first embodiment of the present invention shown in FIG. 1, a resistor array 201 is constructed of a plurality of resistors, one end of which is connected to a reading circuit 204 through a horizontal switch 203 and the other end of which is connected to a cell switch 202.

Two columns of registers of the resistor array 201 are connected to the reading circuit 204 and the horizontal switch 203 is used to select one of the two columns.

One of a plurality of resistors in one column is selected by a cell switch 202 and a vertical shift register 205 is used to control the cell switch 202.

This requires only one reading circuit to be formed for every two columns and provides an advantage in terms of the area and power consumption compared to the case where the reading circuit needs to be formed for every column.

As in the case of the above-described first embodiment shown in FIG. 1, a first multi-value voltage generator 206 is connected to a multi-value voltage bus 207 and a group of switches 208, and supplies a correction voltage to a plurality of reading circuits 204.

Likewise, a second multi-value voltage generator 209 is connected to a multi-value voltage bus 210 and a group of switches 211, forming a second correction circuit system.

A reference voltage circuit (BGR) 212 generates a voltage serving as a reference for voltage generation of the multi-value voltage generators and uses a band gap reference, etc., whose voltage temperature coefficient is extremely small.

A bias circuit 213 receives the reference voltage from the reference voltage circuit 212 and generates voltages necessary for the first and second multi-value voltage generators 206 and 209.

In this way, the correction voltage supplied to the resistor array 201 becomes a voltage with high temperature stability and both resistor array current Ibol and canceller current Ican become currents created from one reference voltage. Thus, if a tiny temperature variation occurs, the variation in Ibol-Ican is very small. Therefore, it allows integration operation and correction operation with considerably high temperature stability.

This is because even if the voltage generated by the reference voltage circuit 212 changes, almost the same variation occurs in both Ibol and Ican and basically no change occurs in Ibol-Ican.

A second latch 215 supplies correction data to a decoder 217 as in the case of the example shown in FIG. 1. A first latch 214 is used to load data from a memory outside the chip while the second latch 215 retains the correction data. Data is transferred from the first latch to the second latch all at once immediately before an integration operation.

PRACTICAL EXAMPLES

Specific examples of the above-described embodiment will be explained in further detail. The following is an explanation of an operation of a practical example of the present invention applied to a reading circuit of an infrared imaging element.

Figure 3:
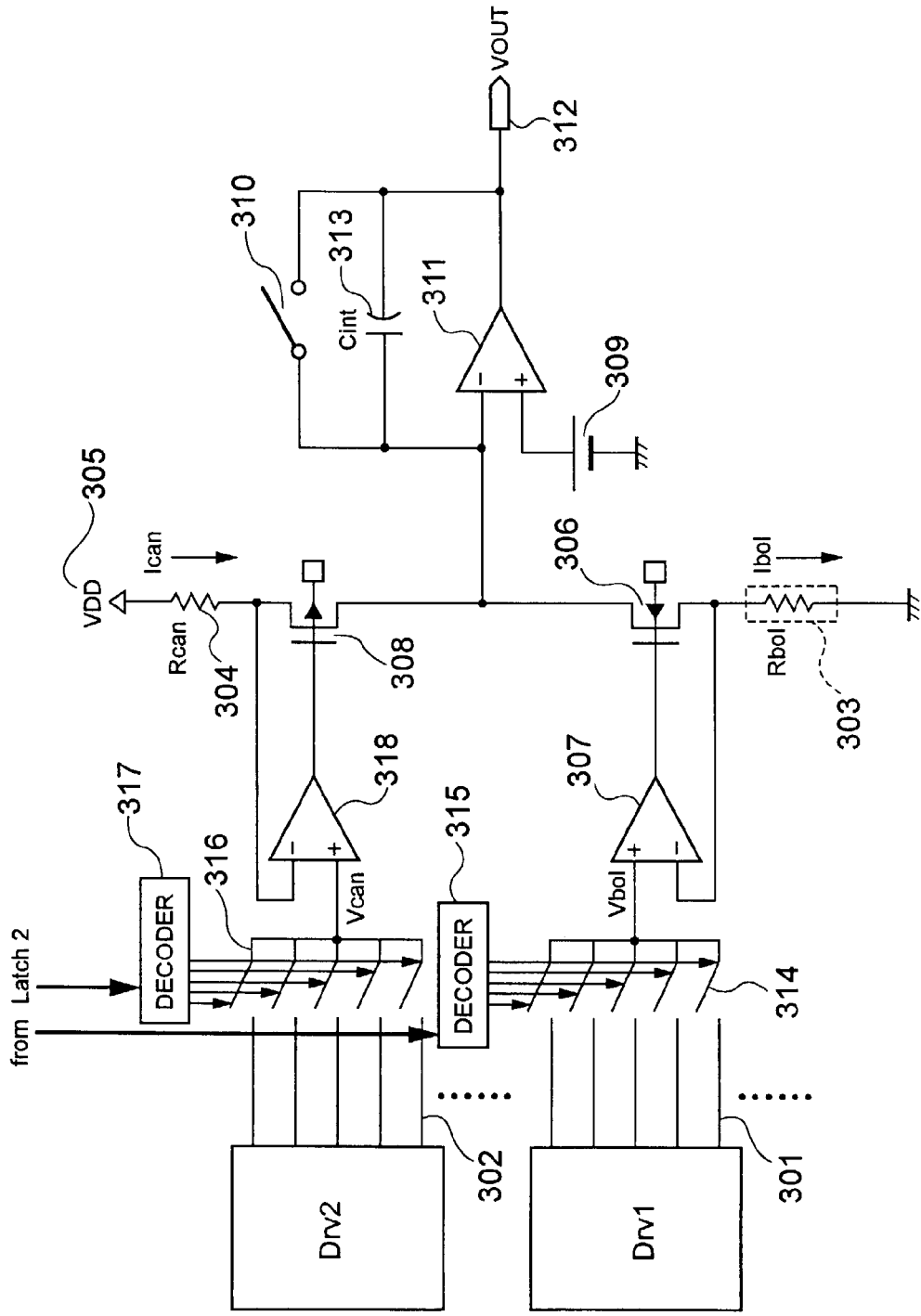
FIG. 3 illustrates another circuit configuration of the infrared imaging device according to the embodiment of the present invention.

FIG. 3 illustrates a reading circuit section and its peripherals according to this practical example and it has basically the same configuration as the embodiment shown in FIG. 1 and FIG. 2. Though FIG. 3 shows only one of a plurality of reading circuits, as shown in FIG. 1 and FIG. 2, a plurality of reading circuits are connected to multi-value voltage buses 301 and 302.

As described above, a bolometer 303 is an element that converts incident infrared radiation to a resistance and FIG. 3 shows only one of the plurality of one-dimensionally or two-dimensionally arranged bolometers.

This bolometer will be explained below. From the standpoint of reducing thermal noise, the smaller its resistance, the better, but when resistance is too small, there is a problem that joule heat will increase when a voltage is applied. In order to increase sensitivity to incident infrared radiation, the bolometer has a structure called "diaphragm" formed on a thin film supported in a hollow-body which prevents heat from dissipating. When joule heat increases, there is a problem that self heat generation of the bolometer increases. Self heat generation can be reduced by decreasing a bolometer voltage, but when the voltage is low, the problem is that the signal voltage also decreases, deteriorating S/N (signal to noise ratio). In consideration of this thermal noise, bolometer voltage or self heat generation, several k$\Omega$ to several hundred k$\Omega$ is usually selected as resistance of the bolometer.

In this example, metal such as titanium or platinum, or semiconductor oxide such as vanadium oxide or titanium oxide is used as the material of the bolometer 303.

Of these materials, metal has the merit of being able to be easily manufactured on a silicon line and having smaller resistance variations, whereas it has a problem of generally having a low resistance temperature coefficient, which is important in converting incident infrared radiation to resistance variation. Normally, a resistance temperature coefficient of up to approximately 0.5%/K is generally used.

While a semiconductor oxide system exhibits a high resistance temperature coefficient on the order of several %/K, the semiconductor oxide system has a problem that it is hard to be manufactured on a silicon line or it has large resistance variations. Especially, it usually has resistance variations of several % p-p (peak to peak) up to several tens of % p-p. This is attributable to the fact that the material itself is polycrystalline or has large resistance to contact with wiring metal because of high specific resistance. However, a resistance temperature coefficient of several %/K is necessary for improving temperature resolution of an infrared imaging element and the use of a semiconductor oxide system is significant even if correction of resistance variations needs to be adopted.

As described above, the greater the bolometer voltages the greater the signal voltage, and S/N is improved. Thus, several V is preferable as a bolometer voltage.

On the other hand, the cancellation resistor 304 is a resistor used to cancel a bolometer current. Large resistance Rcan has a phenomenon causing thermal noise to decrease. The thermal noise is the noise which is converted to a value at the end of the bolometer. However, if the resistance is too large, there is a problem that the voltage between both ends of a resistor (inter-terminal voltage) necessary to create a cancellation current increases, thereby increasing a required withstand voltage of the circuit. Thus, resistance equivalent to that of the bolometer is normally selected as resistance Rcan of the cancellation resistor 304. Therefore, the voltage between both ends of Rcan also becomes a voltage equivalent to the bolometer voltage. When a voltage, for example, a little under 5 V is used as the bolometer voltage, the circuit that creates bolometer voltage Vbol has an excellent withstand voltage of approximately 5 V, and therefore it has the merit of being able to use a general logic IC transistor.

Since the inter-terminal voltage of the cancellation resistor 304 becomes substantially equivalent to the bolometer voltage, approximately 10 V, twice the withstand voltage, is required as a power supply voltage VDD. A process that allows a mixture of 10 V and 5 V transistors exists relatively generally as a process for an EEPROM (electrically erasable programmable read-only memory) that operates on a high voltage VPP and power supply voltage VDD and can be used for infrared imaging elements.

As described above, resistance variations of the bolometer maybe several tens of % p-p. There is a problem with a conventional art to add a constant bolometer voltage when such large variations exist. Applying a constant voltage when there are resistance variations of the bolometer causes the bolometer current Ibol to vary. If there is a tiny drift in the bolometer voltage, that is, voltage variations due to temperature variations, the amount of current drift also varies with each pixel.

On the other hand, the present invention makes the bolometer voltage variable according to resistance variations so that the bolometer current becomes substantially constant, and therefore even if a drift occurs in the bolometer voltage, the drift occurs in the bolometer current but variations hardly occur among pixels.

This substantially constant drift current among pixels can be eliminated, for example, by a circuit according to the aforementioned embodiment in FIG. 2.

That is, the bolometer voltage Vbol and canceller voltage Vcan are created from one reference voltage generation circuit and therefore even if a drift occurs in the reference voltage generation circuit, the same drift occurs in both voltages. This makes the current Ibol and the current Ican the same as drift, which means that the current Ibol-Ican that flows into the integrating capacitor hardly changes.

In the above case, only the drift in the reference voltage generation circuit is considered and drifts in other circuits are not taken into account, but the present invention realizes various circuits to suppress drifts to a negligible level as follows.

According to FIG. 3, both the NMOS transistor 306 and operational amplifier 307 constitute a circuit that applies a voltage to the bolometer and makes the bolometer current flow into the drain, and as described above, it is a circuit in which no influence of Vgs (gate-source voltage) of the NMOS transistor appears in the drain current.

The gate-source voltage Vgs normally has a large temperature coefficient due to temperature dependency of a threshold Vt of the transistor. The circuit in this example has a circuit configuration in which no gate-source voltage Vgs appears in the drain current, thus eliminating influences of the temperature coefficient of gate-source voltage Vgs.

Furthermore, the bias circuit 213 shown in FIG. 2 generates optimum Vbol and Vcan. By using a combination of a resistor R and a resistor 2R, twice the former, so-called "R-2R type A/D converter," makes it possible to suppress drifts to a negligible level with respect to temperature variations.

The voltage span of the first multi-value voltage bus 301 is set, for example, as follows.

Suppose variations in the bolometer resistance are, for example, 20% p-p. That is, when a bolometer resistor of approximately 100 kΩ is assumed, resistance variations of approximately ±10 kΩ exist. Suppose the bolometer voltage for the resistance of 100 kΩ is set to 4 V.

Then, the voltage span necessary for the first multi-value voltage bus only needs to have a 20% p-p span, that is, a 0.8 V span in order to cover 20% p-p of resistance variations. That is, the first multi-value voltage bus covers a voltage range of 3.6 V to 4.4 V.

Of course, the voltage span can have higher percentage than that of resistance variations depending on the specification of resistance variations.

The accuracy of correction is naturally improved as the voltage increment of the first multi-value voltage bus 301 decreases, whereas the number of buses, the number of switches, the scale of the multi-value voltage generator or power consumption also increases accordingly.

As described above, assuming that the number of first system buses is m and the number of second system buses is n, it is possible to suppress current variations due to resistance variations to approximately 1/(m×n). For example, assuming that both m and n are 16 levels, that is, when 16 buses are used for each, it is ideally possible to suppress variations of the current passing through the integrating capacitor to 1/256.

That is, if it is assumed that there are originally current variations due to 20% p-p resistance variations, the present invention has variations in the integrating current not more than:

20/256≈0.08% p-p ("≈" means that both sides are almost equal and the same will apply hereafter)

If current variations are reduced to this level, it is possible to obtain a large integrating gain as will be described later.

If the trade-off of the number of buses is taken into consideration, having 16 first and 16 second system buses is reasonable.

Since the voltage increment of the first multi-value voltage bus is obtained by equally dividing the span of 3.6 to 4.4 V by 16, that is:

0.8/(16−1)≈0.053 V

The total number of buses is m+n and the total accuracy of correction is 1/(m×n), and therefore ideally m=n is optimal to obtain optimum accuracy of correction with the total number of buses. However, given the aforementioned drift, it is possible or preferable to reduce the correction residual of the bolometer current Ibol by adopting a greater m, the number of first multi-value voltage buses for correction on the bolometer side than n, the number of first multi-value voltage buses on the canceller side. It is possible to change the ratio of m to n according to the required performance of drift, etc.

Suppose resistance variations of the bolometer of 20% p-p are reduced to 1.25% p-p, which is 1/16, through the first correction system. On the canceller circuit side, which is the second correction system, the voltage span of the second multi-value voltage bus is set to, for example, 1.25%p-p which is the correction residual of this first system.

It goes without saying that the smaller the voltage increment of the second correction system, the greater the accuracy of correction, but there is a trade-off with the area, scale of the circuit and power consumption, etc. Here, suppose n=16 as in the case of the first system. Thus, variations in the integrating current due to resistance variations can be ideally reduced to approximately 0.08% p-p, 1/(16×16)=1/256 of 20% p-p, which are original variations.

As described above, if the resistance of the canceller resistor 304 is smaller than the resistance of the bolometer, there is a problem that noise becomes problematic and if the resistance is large, the voltage necessary to cancel the bias component of the bolometer current increases and the power supply voltage increases. The total noise vn is expressed by the following formula (1):

$$vn^2 = vjb^2 + vbb^2 + (Rbol/Rcan)^2 \cdot (vjc^2 + vbc^2) \quad (1)$$

where, vjb is thermal noise of the bolometer resistor, vjc is thermal noise of canceller resistor, vbb is noise that exists in the bias systems of the bolometer such as the first multi-value voltage generator, multi-value voltage bus 301 and operational amplifier 307.

Vbc is noise of the bias system of the canceller.

The noise of the canceller resistor or noise of the canceller bias circuit is multiplied by a coefficient of Rbol/Rcan. That is, because a weight of Rbol/Rcan is assigned, decreasing Rcan means increasing noise. In consideration of the power supply voltage, too, Rbol≈Rcan is preferable.

When considerations are given to the voltage of the second multi-value voltage bus 302, the VDD power supply voltage 305 is preferably set to, for example, approximately 10 V as described above. The canceller resistance is supposed to be, for example, 100 kΩ, the same as the bolometer resistance.

Since a voltage of 4 V is applied to the bolometer resistor at its center, it is necessary to apply 4 V to the canceller resistor in order to cancel the bias component.

Since the power supply voltage is 10V, approximately 10−4=6 V is required as the center voltage of Vcan.

Since the span of the second multi-value voltage bus is 1.25% p-p, the span voltage is:

4V×2.5% p-p=0.05 Vp-p

That is, the second multi-value voltage bus generates voltages of 3.975 to 4.025 V and equally divides this range by 16 buses. The voltage increment is:

0.05/(16−1)≈3.3 mV

In this way, the voltage increment of the second system is smaller than that of the first system, but it is possible to easily generate such a voltage using a circuit which will be described later.

This embodiment has explained two multi-value voltage systems, but it is possible to easily expand the systems to three or more systems. For example, suppose there are three systems and the respective numbers of buses are 1, m and n. Then, current variations due to resistance variations can be ideally set to:

$$1/(1 \times m \times n)$$

The total number of buses required is not more than 1+m+n.

Whether the system on the ground side using the NMOS transistor or the system on the VDD side using the PMOS transistor is used as the third system can be arbitrarily decided and either one is acceptable.

The second system is important in the sense that it eliminates the bias component of the bolometer current.

The third and subsequent systems are optional, but it is necessary to consider the required accuracy of correction and the trade-off of the area of the multi-value voltage generator and power consumption when the number of systems is increased.

The difference between the canceller current Ican and bolometer current Ibol:

$$Icah-Ibol$$

flows into the integrating circuit.

The integrating circuit uses an operational amplifier. Of course, it is also possible to consider a configuration with only the integrating capacitor and reset switch without any operational amplifier.

As stated above, the use of the operational amplifier makes it possible to keep the drain voltages of the transistors 306 and 308 constant and suppress variations in the drain currents due to channel lengths modulation of transistors.

In this case, the drain voltage is kept to the voltage of the bias power supply 309. A voltage approximately half the VDD power supply voltage 305 is preferable as this voltage. In order for the transistor to operate normally in a saturation area, approximately 0.3 V is necessary as Veff (effective voltage; drain-source voltage necessary to operate in a saturation area) and considering the bolometer voltage Vbol and canceller voltage Vcan, approximately half the power supply voltage is preferred as the drain voltage.

In this example, the drain voltage, that is, voltage of the bias power supply 309 is preferably set to 5 V.

The positive input terminal and negative input terminal of the operational amplifier 311 are always set to the same voltage by means of virtual grounding.

Integration of current Ican-Ibol is started when the reset operation by the reset switch 310 is completed. The reset operation causes the potential between both ends of the integrating capacitor 313 to become 0 V and causes the output voltage (vout) 312 to become 5 V which is the voltage of the bias voltage 309.

When the reset is canceled, the current Ican-Ibol starts to be stored in the integrating capacitor 313 and the output voltage (vout) 312 changes.

If the current Ican-Ibol is positive, the output voltage (vout) decreases from 5V and if the current Ican-Ibol is negative, the output voltage (vout) increases from 5 V.

Figure 4A:
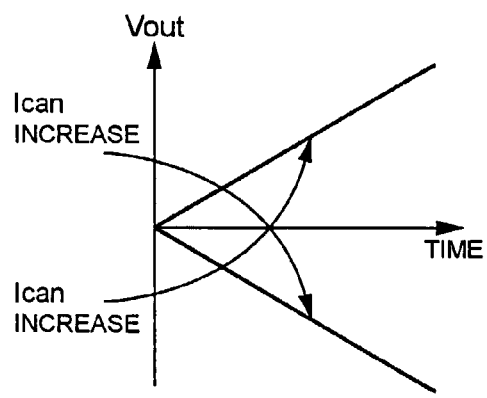
FIG. 4A to FIG. 4D show timing charts showing an operation of the infrared imaging device according to the embodiment of the present invention shown in FIG. 2.

For example, if a negative resistance temperature coefficient is assumed for the bolometer, the power of the incident infrared radiation increases as the temperature of an object increases and at the same time the temperature of the bolometer also increases and the resistance of the bolometer decreases. Then, the bolometer current Ibol increases, the current Ican-Ibol changes in negative direction and vout changes in positive direction (see FIG. 4A).

This integration operation is carried out for a period tint and the output voltage (vout) is sampled at the aforementioned sample-and-hold circuit, time tint after the reset.

Suppose the current Ican-Ibol has changed by $\Delta I$ due to a temperature variation of the object. The variation $\Delta$vout of the output voltage (vout) due to this integration operation is given by the following formula (2):

$$\Delta vout = -(tint/Cint) \cdot \Delta I \quad (2)$$

where the capacitance of the integrating capacitor is Cint.

That is, the absolute value of the integrating gain relative to the integrating current becomes:

$$tint/Cint$$

Since $$\Delta I = (\Delta Rbol/Rbol) \cdot Vbol/Rbol$$

formula (2) becomes the following formula (3):

$$\Delta vout = -(\Delta Rbol/Rbol) \cdot Vbol \cdot tint/(Cint Rbol) \quad (3)$$

where tint/(CintRbol) is the integrating gain with respect to the signal voltage of ($\Delta$Rbol/Rbol) Vbol.

Suppose bolometer is semiconductor oxide whose resistance temperature coefficient is approximately −2%/K and a temperature variation of the bolometer per temperature variation 1° C. of the object is 4 m° C. The bias current of the bolometer is 4V/100 k $\Omega$=40 µA in this embodiment.

As the temperature variation of the object, a temperature dynamic range of approximately 150° C. is normally required and the percentage of the current variation over 150° C. is:

$$150 \times 4 \ m° \ C. \times 2\%/K = 1.2\%$$

As described above, this practical example supposes a correction residual of approximately 0.08% p-p and adjusts it to be smaller than 1.2%. Since the circuit dynamic range is determined, this is intended to prevent the correction residual from becoming dominant, that is, to adapt signal variations by the object so as to be fitted within the full dynamic range of the circuit.

For example, suppose 5 V from 2.5 to 7.5 V as the dynamic range of the vout voltage. Furthermore, suppose 2.5 V, the half of 5 V, is used due to variations of the object. At this time, the occupation of the circuit dynamic range by the correction residual is determined by 0.08%/1.2% which is the ratio of the aforementioned temperature dynamic range to the correction residual as follows:

$$2.5V \times (0.08\%/1.2\%) \approx 0.17V$$

By correction of variations according to the present invention, the correction residual is suppressed to a very small level with respect to the circuit dynamic range.

A value necessary for the integrating capacitor is calculated as follows.

Assuming that the integration time is 30 µs, the capacitance necessary for the integrating capacitor is:

$$Cint = tint \times \Delta I/\Delta vout = 30 \ \mu s \times 40 \ \mu A \times 1.2\%/2.5 \ V \approx 5.8 \ pF$$

In this case, the integrating gain with respect to the aforementioned signal voltage:

$$tint/(Cint Rbol)$$

becomes:

$$30 \ \mu s/(5.8 \ pF \cdot 100 \ \Omega) \approx 52$$

Since the present invention suppresses current variations due to resistance variations, it is possible to obtain a high integrating gain.

Lengthening the integration time tint has two meanings. One is that the band of noise is determined by 1/(2·tint) and the band of noise is narrowed by increasing tint and it is possible to decrease the effective voltage of noise. The other meaning is that increasing the integrating gain allows the subsequent noise to become less noticeable.

Work for correcting the current Ican-Ibol using the first correction system and second correction system is carried out with a surface kept, for example, at 25° C. placed in front of this infrared imaging device.

Figure 4B:
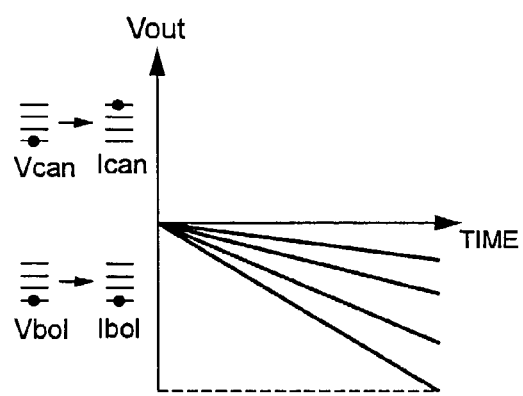

The first and second systems can each select a plurality of voltages and as shown in FIG. 4B, for example, the second system selects one bus voltage that corresponds to a maximum of Ican, while the first system selects one bus voltage that corresponds to a minimum of Ibol In this condition, suppose all the plurality of bolometers except defective pixels satisfy:

Ican-Ibol≧0 that is, suppose that the output voltage Vout becomes 5 V through the reset operation. Then, since Ican-Ibol≧0 the output voltage Vout becomes 5 V or less.

Figure 5A:
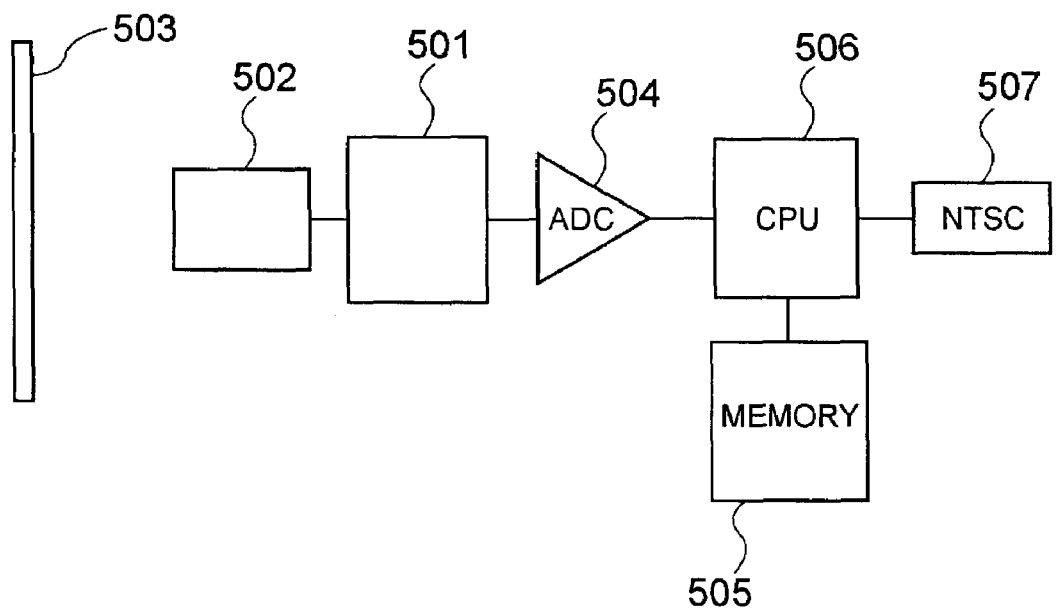
FIG. 5A and FIG. 5B show a schematic configuration of the infrared imaging device according to the embodiment of the present invention.

Correction data is acquired using an infrared imaging device in the configuration shown in FIG. 5A, for example. For example, an optical system 502 is placed in front of an infrared imaging chip 501 in the configuration shown in FIG. 3 and further a uniform infrared surface light source 503 which is kept, for example, at 25° C. is placed. An A/D converter 504 that converts an analog signal to a digital signal is connected to the output of the infrared imaging chip 501, and the apparatus is further provided with a CPU 506 that calculates digital signals or exchanges data with a memory and an NTSC signal generator 507 that generates an NTSC signal.

Correction data is acquired by a bifurcated search method. For example, in the case of 16 buses, data is converted to 4-bit binary data and "1" is set for each of these four bits and if setting "1" causes the data to miss a target range, the bit is returned to "0" and if setting "1" causes the data to fall within the target range, the bit is left as is. A decision whether data is within the target range or not is made by digital calculations by the CPU 506.

Figure 5B:
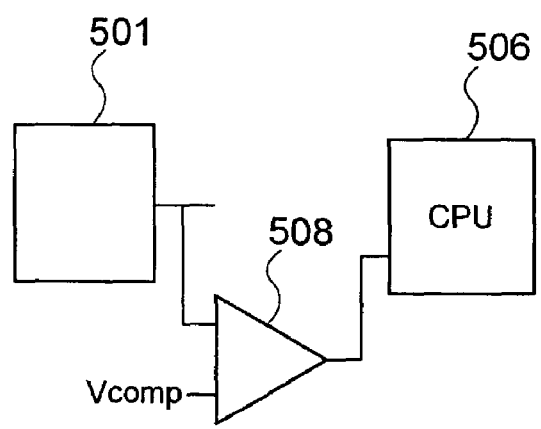

As shown in FIG. 5B, such an operation can also be realized with a configuration using an analog comparator 508 that compares the output voltage of the infrared imaging chip 501 with a comparative voltage Vcomp and outputs the comparison result to the CPU 506 as a logical value.

In the configuration shown in FIG. 5B, a bifurcated search for the correction data of the first system is conducted. Before carrying out the correction shown in FIG. 4B, suppose the vout output level of each pixel varies within 5 V. Suppose correction is performed to gather these voltage variations around 5 V, which is the center of the dynamic range.

Using A/D-converted digital data, the CPU 506 decides whether the vout level of a certain pixel falls below or exceeds 5 V. The correction data of the first system, that is, switch information of the multi-value voltage bus is stored in a memory 505. In this case, a storage capacity of (the number of pixels×the number of bits) is required as the correction data memory of the first system.

The switch of the first multi-value voltage bus of each pixel before correction is set to the minimum of 16 voltage levels and considering 4-bit binary data, suppose all bits are set to "0." In this condition, when "1" is set in the binary MSB for all reading circuits, the bus voltage at the eighth lowest level is set. At this time, the CPU 506 checks output voltages (vout) of pixels one by one and writes "1" for pixels whose vout is 5 V or below considering them as the MSB data and writes "0" for pixels whose vout exceeds 5 V.

Figure 4C:
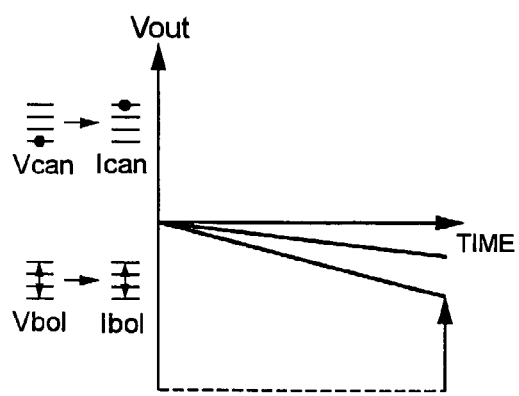

This procedure is carried out for all pixels. This reduces variations in the output voltage (vout) due to resistance variations approximately in half as shown in FIG. 4C.

Furthermore, "1" is set in the lower bit next to the MSB and the same decision is made to decide whether this bit is "1" or "0." This procedure is repeated for all bits down to the LSB and correction data of the first system is confirmed.

This reduces variations in the output voltage (vout) due to resistance variations in half one after another and the 4-bit first correction system reduces variations in the output voltage (vout) to approximately 1/16.

Figure 4D:
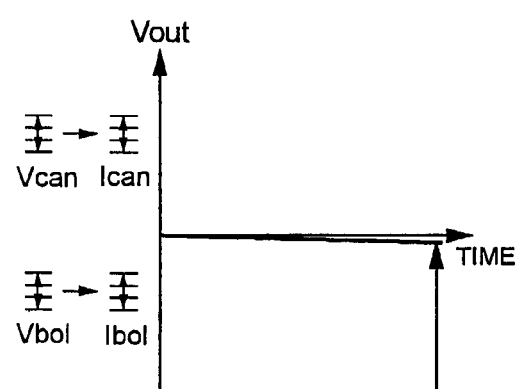

Correction data of the second system can also be acquired using the same method. In the examples in FIG. 4B and FIG. 4C, a maximum current flows into the second system. This example is only different from the first system in that it performs a bifurcated search in the direction in which the maximum current is reduced and the same bifurcated search can be carried out. As a result, as shown in FIG. 4D, variations in the output voltage (vout) become approximately 1/256 of those in FIG. 4B, suppressing variations to minimal correction residual.

The first group of switches 314 in FIG. 3 consists of 16 switches in this example and selects one of 16 voltage levels of the multi-value voltage bus 301. The first decoder 315 receives binary data for switch selection and select one switch. For example, it receives 4-bit data and selects the voltage level of one of the 16 buses. For example, when binary data of all "0"s is received, one at the minimum potential of the multi-value voltage bus is selected. Every time the binary data is incremented, a voltage one step higher is selected and in the case of binary data of all "1"s, one at the maximum potential is selected. The same applies to the second group of switches 316 and second decoder 317 as well. When binary data values are all "0"s, the minimum potential may be selected or contrarily the maximum potential may also be selected and the logic of the decoder is determined arbitrarily.

The decoder converts, for example, 4 binary data pieces to 16 switch selection data pieces, and this decoder is preferably placed close to the switch group. This is because when data is sent from the second latch 215 to the group of switches, from the standpoint of area efficiency it is preferable that wiring be made up to a point close to the switches with a smaller number of wires and the number of wires be increased at the decoder close to the switches. It is also preferable that the group of switches and the multi-value voltage bus be analog circuits to minimize an overlap with the digital signal. Wiring up to the group of switches with a fewer number of wires can reduce this overlap with the analog circuits and reduce the danger of giving noise of the digital circuits to the analog circuits.

As shown in this example, the second system produces a high voltage signal. There is a merit that the signal voltage increases as the applied voltage of the bolometer increases. For this reason, the second system has a voltage of approximately 5 V to 10 V.

From the standpoint of low power consumption, a power supply voltage of 5 V or 3.3 V or less is used for the logic system.

When the analog voltage handled by the second group of switches exceeds the logic voltage, a level conversion circuit for the switch control voltage is required.

The second decoder 317 is also provided with a level conversion circuit that converts a 5 V system logic voltage to a 10 V system switch control voltage. For example, after decoding to 16 levels is performed from 4 bits, a 5 V system logic is converted to a 10 V system amplitude.

Figure 6:
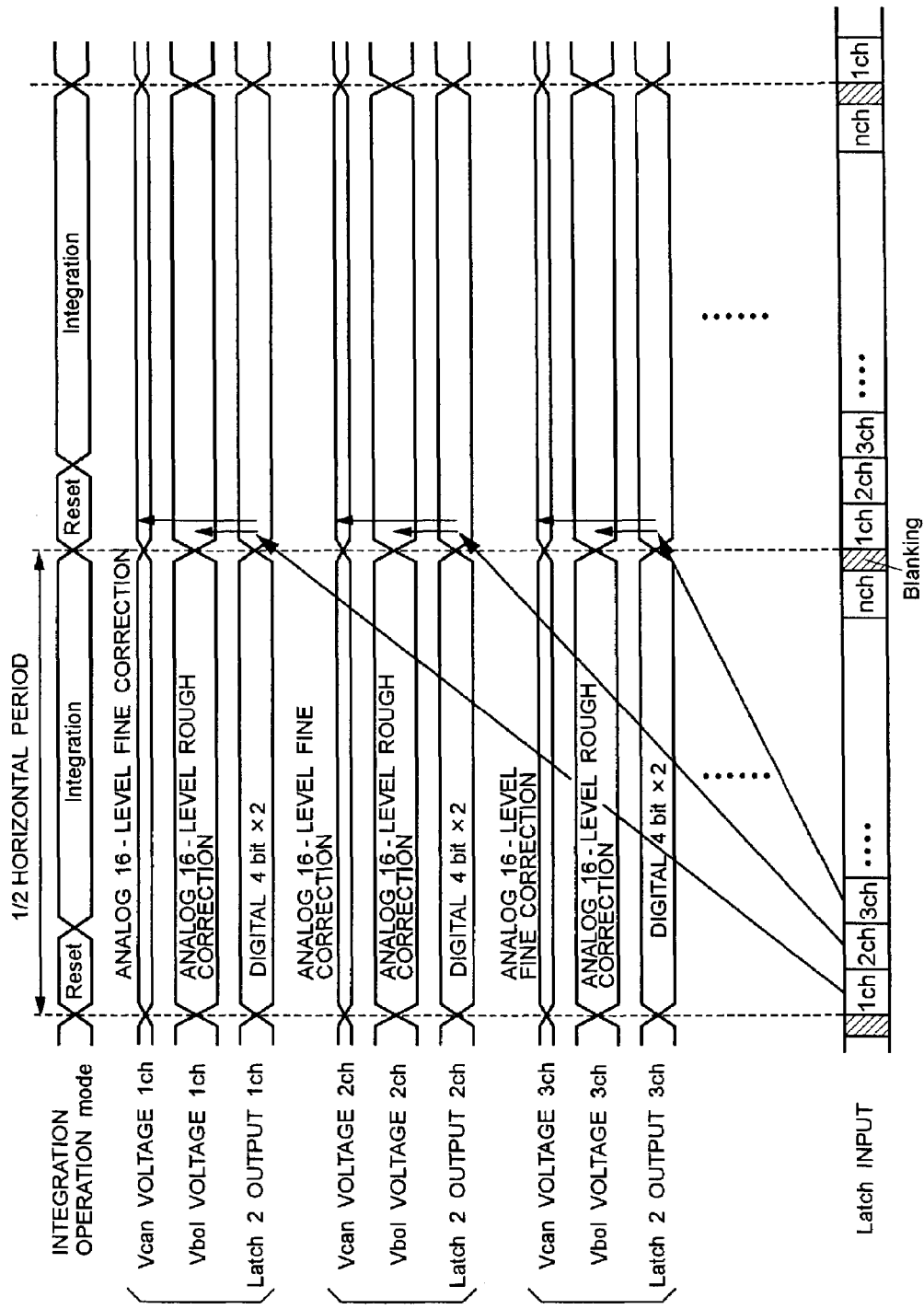
FIG. 6 is a timing chart showing an operation of the infrared imaging device according to the embodiment of the present invention shown in FIG. 2.

FIG. 6 shows correction data input timings and switch group operation timings. A section from a dotted line to another dotted line represents, for example, a 1/2 horizontal period, which corresponds to a time of approximately $1/(240\times60\times2)\approx35$ µs with 320×240 pixels and 60 Hz frame frequency.

Since this embodiment has one reading circuit for two columns, it carries out integration twice for one horizontal period to read a signal with 320 pixels per row. The number of reading circuits in this example is 160 and the correction data input to the first latch during the 1/2 horizontal period also becomes 160 reading circuit data pieces. The data from the first to 160th channels is input to the first latch one by one as shown in FIG. 6.

As shown in FIG. 2, the first latch 214 and second latch 215 are each constructed of a latch with 160 channels. Each channel handles data for setting the first multi-value voltage bus and data for setting the second multi-value voltage bus. In this example, both the first and second latches require a latch with a total of 8 bits per channel; 4 bits for the first system and 4 bits for the second system.

At the timing of the beginning of the 1/2 horizontal period, data is transferred from the first latch to the second latch all at once and the second latch retains this data for an approximately 1/2 horizontal period. Since a batch data transfer is carried out during a reset period, there is no influence on the integration operation.

The setting of the second latch is immediately reflected in the first group of switches 314 and second group of switches 316 through the decoders and one of voltages in the multi-value voltage bus appears in the bolometer voltage Vbol which is rough correction and canceller voltage Vcan which is fine correction.

The voltage that appears is a voltage at which the correction residual searched by the aforementioned bifurcated search method becomes a minimum. Of course, the Vcan voltage and Vbol voltage are then determined by the resistance of the bolometer connected to the reading circuit of each channel and they function so that current variations due to resistance variations become a minimum.

Figure 7:
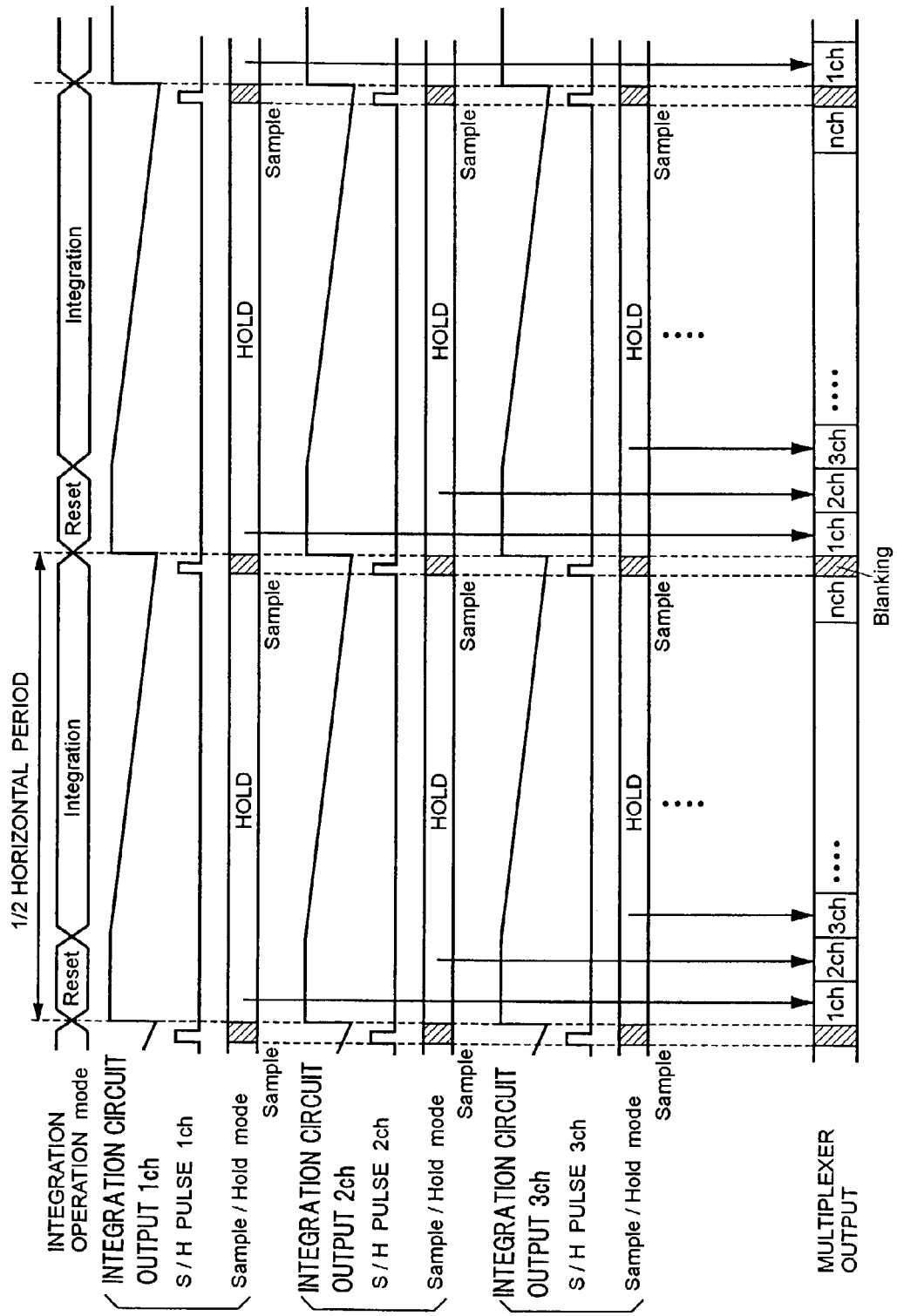
FIG. 7 is a timing chart showing an operation of the infrared imaging device according to the embodiment of the present invention shown in FIG. 2.

FIG. 7 is a timing chart showing an integration operation, the sample-and-hold and multiplexer operations. As in the case of FIG. 6, a section between dotted lines represents a 1/2 horizontal period.

In this example, 160 reading circuits perform integration operations simultaneously. When the aforementioned reset operation is completed, an integration operation starts. The gradient of an integral waveform changes depending on incident infrared radiation that passes through the optical system. For example, the output of the integrating circuit through the reset operation becomes 5 V in this example.

Suppose correction is performed such that the infrared surface light source at 25° C. is shown and the output voltages are gathered around 5 V. At pixels seeing an object whose temperature is higher than 25° C., the bolometer resistance decreases, current Ibol increases and integral output voltage vout increases. That is, it is an integral waveform on the increase. At pixels seeing an object whose temperature is lower than 25° C., the bolometer shows an integral waveform on the decrease. However, this is an idealized operation and in practice it is necessary to consider incident infrared radiation other than infrared rays that have passed through the optical system, for example, temperature variation of the camera housing, influences of self-heat generation with joule heat due to the voltage applied to the bolometer, etc. The influences of temperature variation of the camera housing is often greater than temperature variation of an object being observed.

The integral waveform is sampled by a sample-and-hold circuit toward the end of the 1/2 period and the sampled value is held until the next sampling. Sampling is performed with S/H pulses for all reading circuits simultaneously.

While being held by the sample-and-hold circuit, the multiplexer circuit outputs signals of various channels one after another to the multiplexer output and the outputs are output to the output 216 through a buffer, etc. Such sample-and-hold and multiplexer operations allow simultaneous integration operations of 160 channels and allow signals to be output outside the chip during the integration operations.

Figure 8:
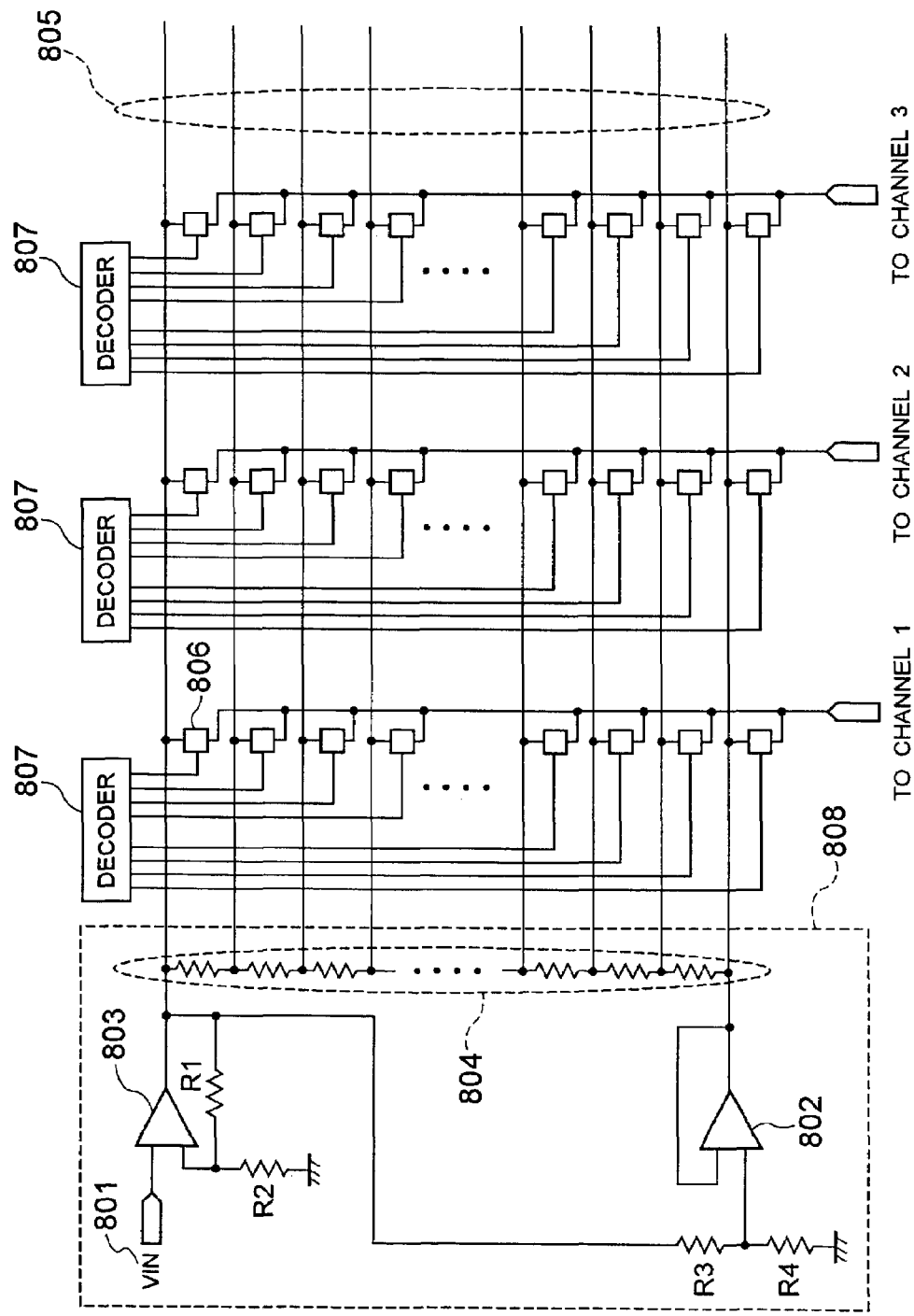
FIG. 8 illustrates a circuit configuration of a semiconductor apparatus according to a second embodiment of the present invention.

FIG. 8 illustrates a more detailed circuit configuration of the multi-value voltage generator, multi-value voltage bus, group of switches and decoders. The multi-value voltage generator 808 generates a multi-value analog voltage using the input voltage 801 as an input voltage and using a first driver 802, second driver 803 and group of resistors 804. The second driver 803 is, for example, a non-inverting amplifier using an operational amplifier and generates a voltage:

$$(1+R1/R2)\cdot VIN$$

using resistors R1 and R2.

Since the first multi-value voltage generator of this embodiment needs to generate a voltage 1.1 times VIN, for example, R1=5 kΩ and R2=50 kΩ are set. The first driver 802 generates a voltage 0.9 times the input voltage in this example. In this example, the output voltage of the second driver 803 is received, divided by a voltage divider made up of the resistors R3 and R4 and input to a voltage follower.

By setting R3/R4=0.82, for example, R3=16.4 kΩ, R4=20 kΩ, it is possible to obtain 1.1 VIN to 0.9 VIN.

Thus, instead of directly receiving the input voltage of the first driver 802 from the VIN, but by receiving it through the second driver 803, it is possible to increase the input impedance of the multi-value voltage generator 808 to an extremely high level or ideally make the input impedance infinite. This has the merit of eliminating the need for increased drive performance of the circuit that generates the input voltage VIN.

The group of resistors 804 is constructed of series connection of 15 equal resistances and the topmost terminal of the group of resistors 804 in FIG. 8 is connected to the output terminal of the second driver 803, the lowermost terminal in FIG. 8 is connected to the output terminal of the first driver 802. It is possible to generate 16 equally spaced voltages from the respective taps of the group of resistors 804 from the voltage generated by the second driver 803 to the voltage generated by the first driver 802. To be more precise, when the section from voltage A to voltage B is equally divided by n resistors, the voltage increment becomes (B-A)/n. In this example, the section from 0.9 VIN to 1.1 VIN is divided by 15 resistors, and therefore the voltage increment is 0.0133 VIN. If VIN=4V, the voltage increment is approximately 0.053 V.

The smaller the resistance of each resistor of the group of resistors 804, the smaller its thermal noise, but the current passing through the resistor increases, and therefore there is a trade-off. When the current passing through the resistor increases, there are a problem of current consumption, a problem of increased 1/f noise of resistance and a problem of increasing the drive performance of the driver, etc.

Furthermore, when the resistance is large, there is a problem that the parasitic capacitance connected to the multi-value voltage bus and time constant made up of resistors of the resistor group increase. There is a problem that it takes time to stabilize the voltage of the multi-value voltage bus when a power supply is turned on or when a set voltage is changed.

Furthermore, as will be described later, instead of a DC voltage, a time varying voltage is input as the input voltage 801 and it is necessary to prevent this time constant from affecting the varying voltage.

Using resistors each of an order of 100 Ω, that is, using a total resistance of 1.5 kΩ as a group of 15 resistors gives preferable results for the problems of the above-described trade-off in many cases.

In consideration of a search for correction data using a bifurcated search, etc., or correction residual, it is preferable that resistances of all 15 resistors of the group of resistors 804 be equal. This is because, voltage increments are equalized and correction residual approximates to quantization noise which is a theoretical limit. For this reason, using resistance elements basically free of operation point dependency is preferable to using diffused resistors having operation point dependency as a resistor of the group of resisters 804. An example of such a resistor is a resistor element using polysilicon. The resistor element using polysilicon is normally electrically separated from a semiconductor substrate, and therefore its resistance never changes depending on a voltage applied to the polysilicon in principle. On the other hand, since a diffused resistor is normally created in a semiconductor substrate, there is a problem that its resistance changes depending on the voltage applied to the diffused resistor, that is, operating voltage using the diffused resistor.

Using a complementary transfer gate using an NMOS transistor and a PMOS transistor the switch 806 can realize low ON-resistance within a relatively wide voltage range. However, to reduce the above-described time constant, it is preferable to use a relatively small dimension (gate length and gate width). In the case of a switch with only an NMOS transistor or only a PMOS transistor and when there is no special problem with ON-resistance, it is preferable to construct each switch with one transistor to reduce parasitic capacitance.

In this embodiment, there are 16 switches per channel and the multi-value voltage bus is provides with 160×16=2560 switches using 160 reading circuits.

When the input capacitance of the operational amplifier 807 connected after the switches and parasitic capacitance of wiring connecting 160 reading circuits are taken into consideration, there is parasitic capacitance of approximately 1000 pF on the multi-value voltage bus. Since this capacitance not only has the above-described problem of time constant but also affects the drive performance and phase compensation of the drivers 802 and 803, small capacitance is preferable.

Third Embodiment

Figure 9:
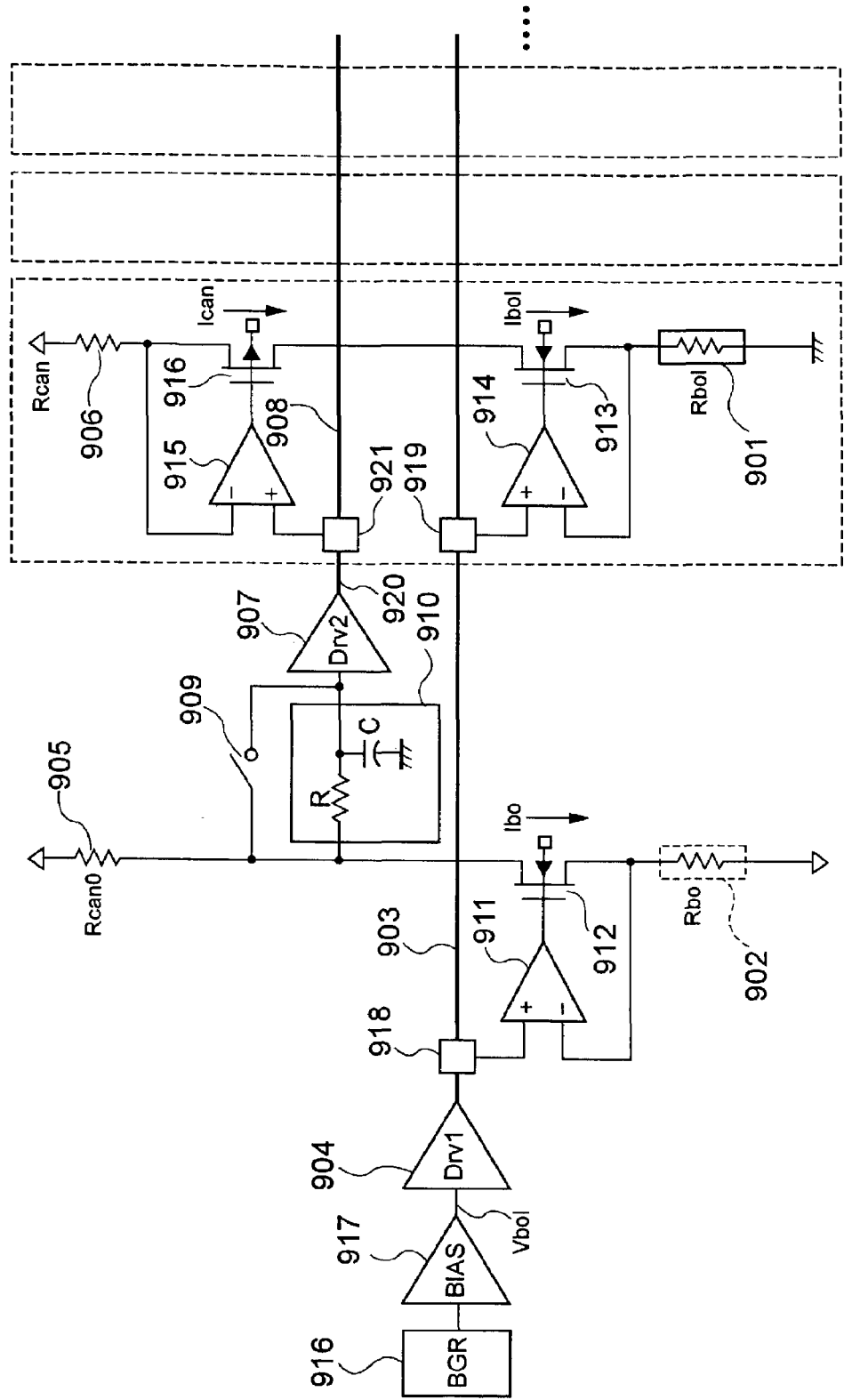
FIG. 9 illustrates a circuit configuration of a semiconductor apparatus according to a third embodiment of the present invention.

Then, a third embodiment of the present invention will be explained. FIG. 9 illustrates a configuration of a third embodiment which is the second embodiment in FIG. 2 with improved drifts.

In FIG. 9, the output voltage may drastically change due to variations in the substrate temperature depending on the function and characteristic of the resistor array 901. This is called "drift." This embodiment reduces drifts considerably compared to the aforementioned second embodiment.

In more detail, with reference to FIG. 9, a resistor array 901 of this embodiment receives a bias voltage from a first multi-value voltage bus 903 as in the case of the above-described second embodiment. A reference resistor 902 is a resistor to correct drifts and is preferably made of the same material as that of the resistor array 901 and has the same resistance. The reference resistor 902 also receives a bias voltage from the first multi-value voltage bus 903. In order for the current flowing through the reference resistor 902 to also flow into a reference cancellation resistor 905, the drain of a transistor 912 is connected to one end of the reference cancellation resistor 905. The reference cancellation resistor 905 and cancellation resistor 906 are preferably constructed of the same material and same resistance. The other end of the reference cancellation resistor 905 is connected to a power supply terminal VDD. Furthermore, the other end of the reference cancellation resistor 905 is connected to a second multi-value voltage generator 907 through a switch 909.

The second multi-value voltage generator 907 is connected to a second multi-value voltage bus 920 and the cancellation resistor 906 receives the voltage selected by a switch 921 out of the bias voltages from the second multi-value voltage bus 920.

In such a configuration, the current passing through the reference cancellation resistor 905 is equal to a current Iob flowing into the reference resistor 902 and the current passing through the cancellation resistor 906 becomes a current equivalent to this Iob multiplied by a certain coefficient. This is because the second multi-value voltage generator 907 generates a plurality of voltages which are the input voltages multiplied by a certain coefficient.

Using the aforementioned bifurcated search method, a current Ibol flowing into the resistor array 901 matches the current Iob flowing into the reference resistor 902 within an error determined by the correction residual.

Furthermore, a current Ican flowing into a cancellation resistor 906 becomes the current equivalent Iob multiplied by a certain coefficient. This can be expressed in the following formula, where the resistance of the reference cancellation resistor 905 is Rcan0 and the resistance of the cancellation resistor is Rcan:

$$Ibol = A \cdot Vbol/Rbol \quad (4)$$

$$Iob = A' \cdot Vbol/Rob \quad (5)$$

$$Ican = B \cdot Iob \cdot Rcan0/Rcan \quad (6)$$

where A·Vbol is a bias voltage of the resistor array determined by a bifurcated search method, A'·Vbol is likewise a bias voltage of the reference resistor, Iob Rcan0 is an input voltage of the second multi-value voltage generator, and B·Iob·Rcan0 is a bias voltage of the cancellation resistor.

When formulae (5) and (6) and Rcan0≈Rcan are taken into consideration, $$Ican = A' \cdot B \cdot Vbol/Rob \quad (7)$$

From formulae (4) and (7)

$$Ican = (A' \cdot B/A)(Rbol/Rob) \cdot Ibol \quad (8)$$

From this, it is possible to say that A, A' and B are searched by a bifurcated search method so that:

$$(A' \cdot B/A)(Rbol/Rob) \approx 1$$

As a result, Ican matches Ibol within an error determined by a correction residual.

Furthermore, even if the substrate temperature changes, if the resistors Rbol and Rob are made of the same material and have substantially the same resistance temperature coefficient, (A'·B/A) (Rbol/Rob) hardly changes and Ican still substantially matches Ibol.

As in the case of the embodiment shown in FIG. 2, when a voltage C times Vbol is input to the input of the second multi-value voltage generator 209, formula (6) becomes:

$$Ican = B \cdot C \cdot Vbol/Rcan \qquad (9)$$

Furthermore, formula (8) becomes:

$$Ican = (B \cdot C/A)(Rbol/Rcan) \cdot Ibol \qquad (10)$$

Since there is no longer the term of the reference voltage, there is basically no influence of variations of the reference voltage source, but Rbol differs from Rcan in the resistance temperature coefficient. Therefore, when the substrate temperature changes, Ican shifts from Ibol. That is, drifts may be problematic depending on the specification of the system.

It is also possible to use a resistor of the same material as that of the resistor array 901 as Rcan. This has the merit of eliminating the problem of drifts described in formula (10). However, just like the resistor array 901 has large resistance variations, resistance variations of Rcan are also likely to increase. Furthermore, when the resistor array includes relatively large 1/f noise, the same 1/f noise may also be generated in Rcan, deteriorating noise. If resistance variations and noise problem are not serious, it is possible to use a resistor of the same material as that of the resistor array 901.

The second merit of this embodiment is that current variations can be corrected by self heat generation of the resistor array. This can be understood by observing formula (8). If the resistor array 901 and the reference resistor 902 are designed to have the same resistance and designed to have the same structure whenever possible, resistors Rbol and Rob have basically the same heat generation though there is some difference corresponding to the resistance variations. Rbol and Rob also have almost the same resistance temperature coefficient, causing thereby almost the same proportion of resistor variations due to self heat generation.

That is, Rbol/Rob does not change even if self heat generation occurs and there is no change in the relationship of Ican substantially matching Ibol. A temperature variation of the resistor array due to self heat generation may reach a level of several ° C. in a pyrolyzed resistor such as a bolometer. That is, the temperature variation may be inconmesurably large with respect to a target signal variation. Due to influences from self heat generation, an integral waveform, which would normally change almost linearly, is bent a great deal and this bent of the integral waveform occupies most of the dynamic range of the circuit, preventing the integrating gain from increasing due to the influence of self heat generation.

The merit of being able to eliminate the influence of self heat generation based on the configuration of this embodiment is extremely large. At this time, a time-varying current flows as the reference pixel current Iob. For example, suppose the current before a voltage is applied is Iob0, an arbitrary coefficient is a and time elapsed after the voltage is applied is t. Then, the following time variation occurs:

$$Iob = (1 + a \cdot t)Iob0$$

This current flows into the reference cancellation resistor, but the reference cancellation resistor normally produces no self heat generation, and therefore a voltage, which varies in a cycle of approximately (1+a·t) is generated between both ends (inter-terminal voltage) of the reference cancellation resistor. This voltage is input to the second multi-value voltage generator and its influence also appears on the second multi-value voltage bus. Therefore, the second multi-value voltage generator and second multi-value voltage bus are required to have high responsivity to keep up with the time variation (1+a·t).

As described above, the present invention can reduce resistance elements and parasitic capacitance included in these circuits to a level small enough to keep up with the time variation (1+a·t) and sufficiently correct the influence of self heat generation.

A third merit of this embodiment is the ability to reduce noise using a filter 910. For example, a switch 909 is normally kept ON and the filter 910 is bypassed to eliminate the above-described influence of self heat generation. When the influence of self heat generation is not too large, for example, when the integrating gain is not too high, the switch 909 is turned off and the voltage of the reference cancellation resistor 905 is connected to the second multi-value voltage generator 907 through the filter 910.

This makes it possible to eliminate noise ahead of the filter 910, for example, noise of the reference cancellation resistor, noise of the reference resistor, noise of the operational amplifier 911 and noise of the first multi-value voltage generator, and reduce the total noise.

Based on the same concept, it is possible to set a filter before the first multi-value voltage generator and eliminate noise of the reference voltage source and the bias circuit.

As the filter, it is possible to use a low pass filter using a resistor (R) and capacitance (C). To eliminate the influence of 1/f noise as much as possible, a time constant of the filter is preferably set to approximately several seconds.

The use of the filter can no longer eliminate the influence of self heat generation, but can still eliminate the influence of drifts. This is because according to formula (8), the filter is involved in the variation of Rob, but drifts normally change with a time constant longer than several seconds and therefore coefficient Rbol/Rob is kept almost constant even if the filter is inserted.

Fourth Embodiment

Figure 10:
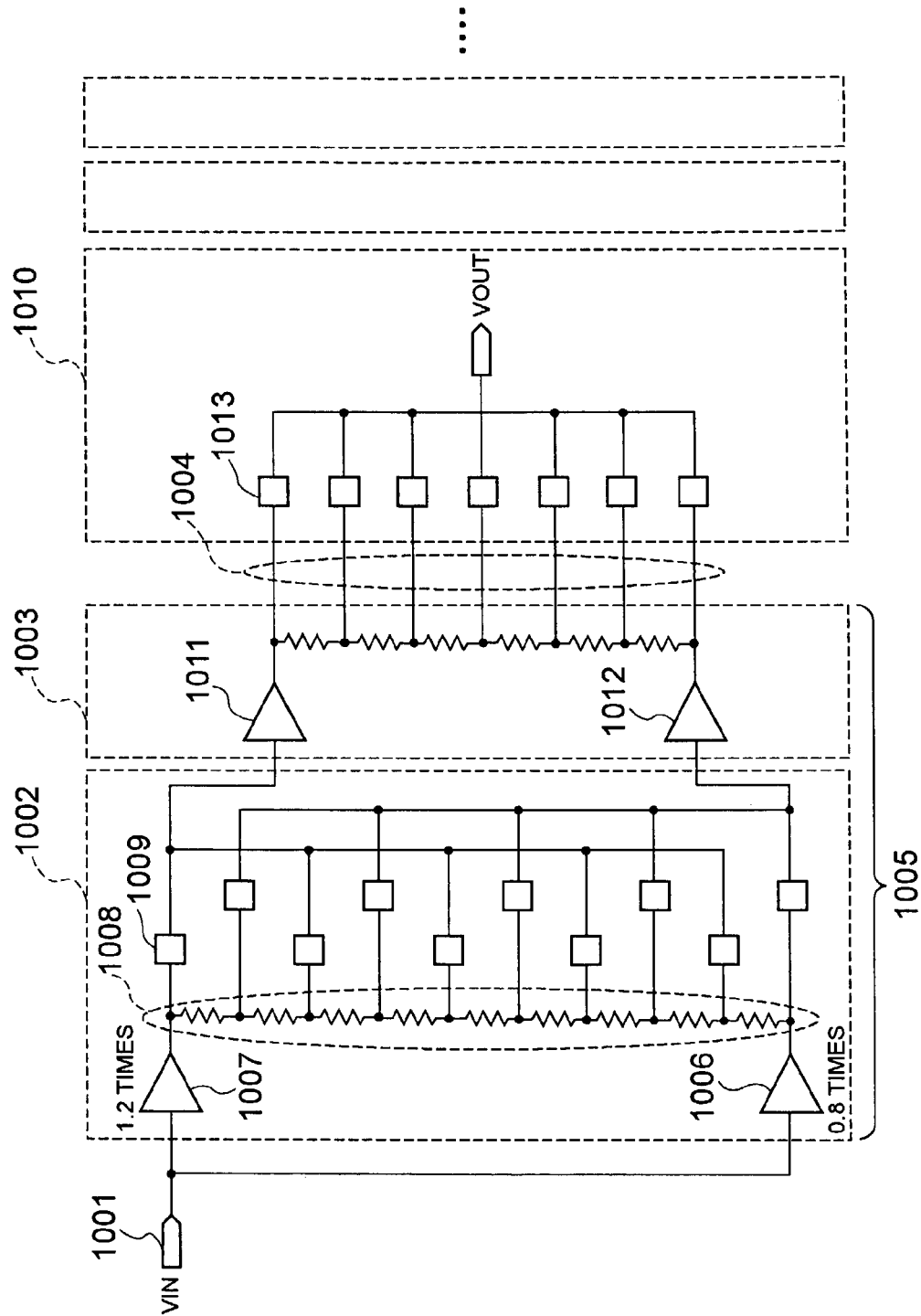
FIG. 10 illustrates a circuit configuration of a semiconductor apparatus according to a fourth embodiment of the present invention.

Then, a fourth embodiment of the present invention will be explained. FIG. 10 illustrates a configuration of the fourth embodiment, which is the second embodiment in FIG. 2 with an improved multi-value voltage generator. This will be effective when rough correction is carried out in a first system and then fine correction is carried out in a second system.

The second system further corrects the residual which has been left after the correction in the first system. This causes a problem that the voltage increment of the multi-value voltage generator becomes relatively small, which inevitably narrows the voltage span with a limited number of buses. Or another problem is that attempting to increase the voltage span will increase the number of buses.

The second system often has the meaning of canceling a bias component and is often required to have a wide span and fine voltage increment.

In the fourth embodiment of the present invention shown in FIG. 10, an input voltage 1001 is input to a voltage span generator 1002 and the voltage span obtained there is input to a multi-value voltage generation element 1003 and the multi-value voltages obtained are supplied to a multi-value voltage buses 1004.

The voltage span generator 1002 and multi-value voltage generation element 1003 constitute one multi-value voltage generator.

Figure 11A:
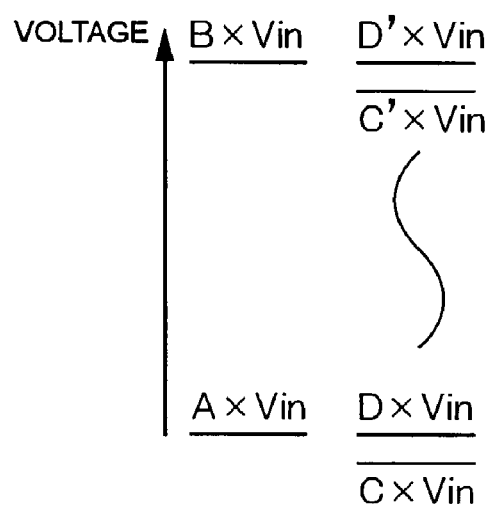
FIG. 11A and FIG. 11B illustrate an operation of the semiconductor apparatus shown in FIG. 10.

The voltage span generator 1002 generates a voltage span necessary for the multi-value voltage buses 1004. For example, as shown in FIG. 11A, the multi-value voltage bus in a certain situation requires a voltage span of C×Vin to D×Vin, while in another situation it may require a voltage span of C'×Vin to D'×Vin. That is, there is a need for a configuration that allows the voltage span or offset of the multi-value voltage bus to be changed arbitrarily.

In many cases, an offset (C×Vin+D×Vin)/2 is arbitrarily changed while keeping the voltage span, that is, (D×Vin−C×Vin). This is because the second system is also provided with the function of eliminating the bias component in many cases. In this case, as shown in FIG. 11A, a voltage range of A×Vin to B×Vin is allowed to be output arbitrarily while keeping the voltage span. At this time, to be precise, the minimum voltage of the offset is:

$$A \times Vin + (D \times Vin - C \times Vin)/2,$$

The maximum voltage is:

$$B \times Vin - (D \times Vin - C \times Vin)/2$$

Figure 11B:
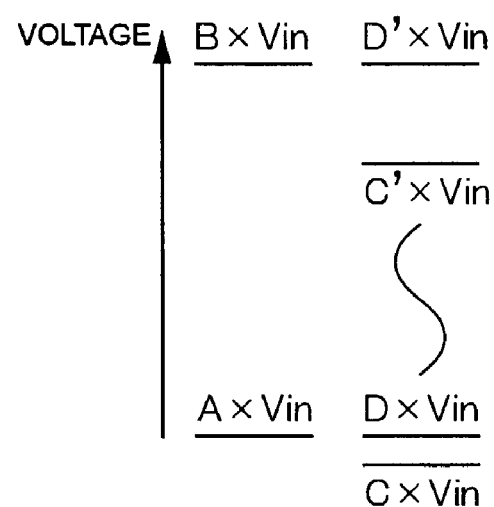

In another case, as shown in FIG. 11B, not only an offset but also a voltage span may be changed arbitrarily. This is because when variations are corrected for the first time in the first system, variations to be corrected may change depending on the chip, wafer or lot.

The fourth embodiment of the present invention can handle both cases in FIG. 11A and FIG. 11B. The voltage span generator 1002 receives the input voltage 1001 and determines a voltage A times the input voltage and a voltage B times the input voltage, which constitute arbitrarily movable voltage ranges. The voltage span generator 1002 outputs a voltage C times the input voltage and a voltage D times the input voltage, which are arbitrary voltages within the voltage ranges of the voltage A times the input voltage and the voltage B times the input voltage.

The multi-value voltage generation element generates a multi-value voltage using the output voltage as an input and its output voltage as a voltage span.

In the example shown in FIG. 11; there is one multi-value voltage generation element, but applying the present invention allows a plurality of multi-value voltage generation elements to be connected arbitrarily. For example, a second multi-value voltage generation element is connected to the output of the multi-value voltage generation element 1003. Or the second multi-value voltage generation element can also be connected to the output of the voltage span generator 1002.

The configuration with the second multi-value voltage generation element connected to the output of the voltage span generator 1002 is used in the following case. For example, there is a case with an infrared imaging device, etc., where the aforementioned reference resistor and the optimum value of the bias voltage given to the resistor array are different. The reference resistor has the same structure as that of the resistor array, but because the presence of incident infrared radiation in the reference resistor is problematic, a shield plate, etc., is often provided to shield incident infrared radiation of the reference resistor. This prevents infrared radiation from entering from the aforementioned housing to the reference resistor, and it is necessary to change an extra bias voltage of the reference resistor corresponding thereto.

The voltage span generator 1002 is constructed in such a way as to include a driver 1006 that generates a voltage A times the input voltage and a driver 1007 that generates a voltage B times the input voltage, apply both voltages to a group of resistors 1008, form switches 1009 at various positions of the group of resistors and extract an arbitrary voltage from the group of resistors.

PRACTICAL EXAMPLES

For example, an example of this embodiment applied to the second multi-value voltage generator of the infrared imaging device explained using FIG. 2 will be explained. The infrared imaging device needs to change the offset of the second multi-value voltage generator for several reasons.

One reason is that a cancellation current needs to be changed according to the above-described housing radiation. The housing radiation changes depending on the ambient temperature at which the apparatus is used or the time elapsed after power is turned on, and therefore the offset needs to be changed as required.

Another reason is that the integration time is changed depending on the object to be observed and when the integration time is changed, self heat generation of the bolometer changes, and therefore the offset needs to be changed.

If such a change occurs after power is turned on and biases of the respective sections are determined, it is most preferable to make adjustment by changing only the offset.

In the example of the infrared imaging device, even if the temperature of the camera housing changes from approximately −10 to 60° C., the driver 1006 sets the voltage generated to 0.8 Vin and the driver 1007 sets the voltage generated to 1.2 Vin so that the respective sections operate within the dynamic range of the circuit.

The voltage of the input voltage Vin is considered relative to the power supply voltage (e.g., 10 V). That is, Vin=−4 V is a voltage seen from the power supply voltage 10 V and it is 6 V when seen from GND.

0.8 Vin is −3.2 V when seen from the power supply voltage and 1.2 Vin is likewise −4.8 V.

That is, the 1.6 V range exists as an arbitrarily movable voltage range and it covers 40% p-p when seen from Vin.

The infrared imaging device requires such a wide range because the influence of housing radiation is very large.

Since the angle other than the angle at which the sensor sees the optical system is used to see the housing, that problem can be easily inferred from analogy. To reduce this influence, a temperature-controlled shield plate, so-called "cold shield" may be placed around the sensor so that the sensor sees this shield plate. However, the problem is that it costs too much or the volume of the cold shield is too large.

The voltage span generator outputs an arbitrary voltage in this range of −3.2 V to −4.8 V as a voltage span. In the example of the infrared imaging device, a voltage of approximately several % to 10% of the Vin input is output as a voltage span.

Considering that current variations of, for example, 20% p-p in the first system become approximately 1/16, that is, approximately 1.25% p-p through correction, the voltage span of approximately 10% may be considered large. However, the infrared imaging device requires this voltage span for the following reasons.

The infrared imaging device has large bolometer resistance variations as well as large sensitivity variations for incident infrared radiation. If there are changes in housing radiation when sensitivity variations are large, the housing temperature changes after the variation correction and current variations may recur according to:

(housing radiation)×(sensitivity variation)

This current variation reaches approximately several % of the bias component depending on the housing temperature variation and the second system requires a voltage span of approximately 10%. For example, suppose 5% is necessary as the voltage span. The multi-value voltage generation element 1003 outputs an arbitrary 5% span from −3.2 V to −4.8 V to the multi-value voltage bus 1004. When the absolute value of the offset voltage is smallest, a span of −3.2 V to −3.4 V is output. −3.3 V is used as the offset voltage.

When there are 16 multi-value voltage buses, the span of −3.2 V to −3.4 V is output in voltage increments of 0.2 V/(16−1).

When the absolute value of the offset voltage is highest, a span of −4.6 V to −4.8 V is output to the multi-value voltage bus.

The offset voltage is −4.7 V. The voltage increment when dividing the section between this lowest offset voltage and highest offset voltage varies depending on the system requirements, but it is preferably set to approximately 1% of the bias component based on the requirement for effectively using the dynamic range of the integrating circuit. The number of resistors of the group of resistors 1008 of the voltage span generator is determined by this approximately 1% offset voltage increment and 40% arbitrarily movable voltage range, and approximately 40 resistors are necessary.

Thinking of an actual operation, the offset voltage when power is turned on is set to −4 V which is the center of the arbitrarily movable voltage range of −3.2 to −4.8 V. 16 voltages of the voltage span of −3.9 to 4.1 V is output to the multi-value voltage bus.

In this condition, a bifurcated search of the first system is carried out and then a bifurcated search of the second system is carried out. This reduces voltage variations at the chip output at which a signal is output from each pixel to approximately the level of correction residual.

Then, when the housing temperature rises, the average chip output voltage rises due to housing radiation and sensitivity variations among pixels cause variations to appear at the chip output again.

The CPU of the camera changes the switch 1009 of the voltage span generator to increase the absolute value of the offset voltage. This is because the bolometer current increases due to housing radiation. At the same time, regenerated variations are corrected by a bifurcated search of the second system.

A first merit of this fourth embodiment is that the offset voltage and voltage span of the multi-value voltage bus can be arbitrarily changed. It is necessary to change the offset voltage or voltage span due to variations in the ambient temperature and substrate temperature, variations among chips, variations among wafers, etc., and this function is realized with a small area while maintaining low power consumption.

A second merit is that it is also possible to input a time-varying voltage as the input voltage 1001 and output it to the multi-value voltage bus.

In combination with the aforementioned configuration of dynamically correcting temperature drifts, this embodiment enables a stable operation with a wide temperature range.

The present invention can be used to correct variations of any elements or circuits. When seen as an equivalent circuit, there can be elements such as those expressed as resistors, those expressed as capacitors, those expressed as inductances, those expressed as transistors, those expressed as diodes or combinations thereof.

Fifth Embodiment

Figure 12:
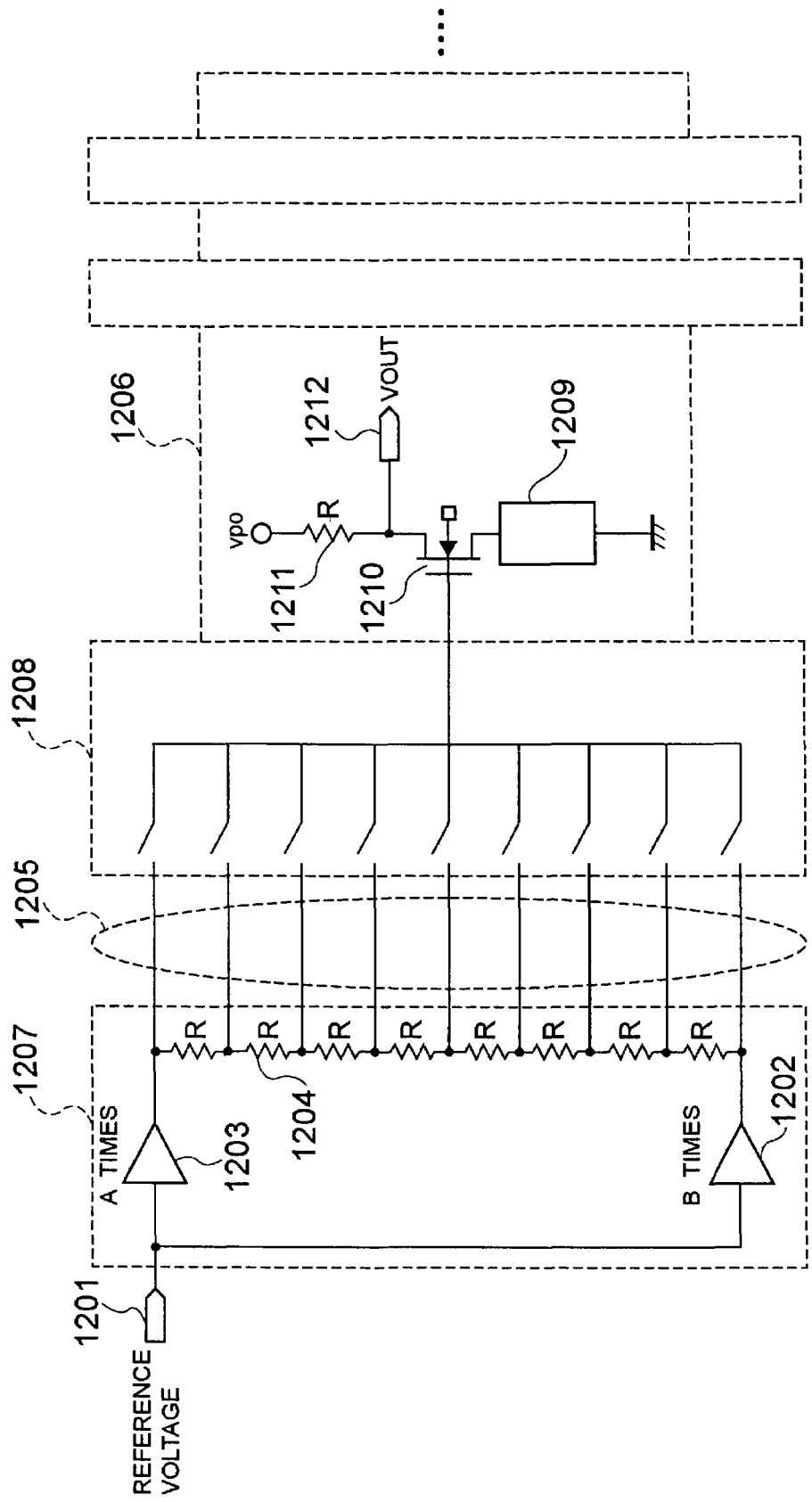
FIG. 12 illustrates a circuit configuration of a semiconductor apparatus according to a fifth embodiment of the present invention.

Then, a fifth embodiment of the present invention will be explained. FIG. 12 illustrates a configuration of the fifth embodiment in which the present invention is applied to variation correction of a plurality of such elements. According to FIG. 12, it is constructed of a multi-value voltage generator 1207, multi-value voltage buses 1205, a group of switches 1208 and a plurality of circuits 1206 made up of such elements having variations.

More specifically, it is also provided with a first driver 1202 that receives a reference voltage 1201 and generates a voltage A times the reference voltage, a second driver 1203 that generates a voltage B times the reference voltage and a group of resistors 1204.

Any circuit made up of elements having variations can be a correction target if its characteristics change depending on a voltage or current. Correction by a current can be performed by a voltage-current conversion.

A circuit 1206 includes, for example, an element 1209, a transistor 1210, a resistor 1211 and an output terminal 1212. The element 1209, transistor 1210 and resistor 1211 are considered to have some variations, but the present invention regards those variations as variations of the circuit 1206, and therefore it does not matter where the principal variations exist in the circuit. For ease of explanation, suppose, for example, the element 1209 has variations.

The multi-value voltage generator has the function of generating a plurality of analog voltages and there is a variety of circuits to realize this function such as:

A circuit that uses the above-described group of resistors

A so-called switched capacitor circuit using a group of capacitors

The operation of this embodiment is basically the same as the operation of the aforementioned embodiment. The driver 1202 that receives an input voltage generates a voltage A times the input voltage and the output of the driver 1202 is connected to one terminal of the group of resistors 1204. The driver 1203 generates a ×B voltage and the output of the driver 1203 is connected to the other end of the group of resistors. Terminals of the respective resistors of the group of resistors 1204 are extracted and connected to the multi-value voltage bus 1205. The group of switches 1208 selects one voltage from the multi-value voltage buses and supplies it to the circuit 1206.

In the circuit 1206 this one voltage is connected to the gate of the transistor 1210, which supplies a voltage to the element 1209 and allows the current flows into the element to flow into the resistor 1211. At the output terminal 1212, a voltage generated at the resistor 1211 appears.

Before correcting variations, the output terminal 1212 fluctuates due to variations in the elements in the circuit 1206. By observing the voltage of the output terminal 1212, the selection of the group of switches 1208 is switched in such a way that variations among the circuit 1206 become smaller. This causes variations of the output voltage of the output terminal 1212 to reduce down to approximately a theoretical limit determined by quantization noise.

In addition to the aforementioned infrared imaging element, there is a variety of elements presented as a resistor when seen as an equivalent circuit such as an element that detects a stress variation of a resistor due to a pressure variation as a resistance variation using a piezo resistor as in the case of a pressure sensor, acceleration sensor using a piezo resistor, flow sensor or mass flow sensor using the same operation as that of a bolometer that detects a flow rate of a fluid based on a temperature variation of a diaphragm, MRAM (magnetic memory: Magnetic-RAM) using a magnetic resistance effect and phase change memory (Ovonic Unified Memory: also referred to as "OUM").

Diffused resistors used for general semiconductors and polysilicon resistors also have variations of approximately several % to several tens of % and are subject to variation correction of the present invention.

There are a variety of elements indicated as capacitance when seen as an equivalent circuit such as a capacitor of a capacitive acceleration sensor, capacitor of a capacitive pressure sensor, capacitor of a switched capacitor and varactor used for a high frequency circuit.

A capacitor of a gate oxide film used for general semiconductors and a capacitor of an inter-layer insulating film, etc., also have variations of approximately several % to several tens of % and are subject to variation correction of the present invention. Correction is possible because charge of a capacitor varies by changing a voltage or current.

An inductance is an element positively used on a chip of a wireless circuit in recent years and its variations also affect characteristics of a high frequency amplifier, oscillator, pulse generator or multiplier, and is subject to variation correction of the present invention.

Correction is possible because the voltage of an inductance changes at:

$$L \cdot dI/dt$$

by changing time variation dI/dt of a current.

A forward voltage of a diode is used for band gap references, etc., a small signal capacitor is used as a varactor or a small signal resistor is used as a variable resistor. Their characteristics change depending on a voltage or current, and therefore they are subject to variation correction of the present invention.

Minimum processing dimensions of semiconductors in recent years reach a level of approximately 100 nm or even smaller and variations in a threshold voltage Vt, ON-current (voltage when a power supply voltage is applied to the gate or drain), base-emitter voltage Vbe, current amplification factor hfe, early voltage, mutual conductance gm, drain small signal resistor rds, collector small signal resistor rc, S parameter, etc., of a MOS transistor or bipolar transistor are increasing considerably.

Efforts are being made to reduce these variations by improving the process and device structure, but improvements from the standpoint of a circuit and architecture are also required.

For variation correction from the standpoint of a circuit and architecture, area overhead and power consumption overhead constitute a big problem. The present invention allows variation correction with a small area and less power consumption.

Sixth Embodiment

Figure 13:
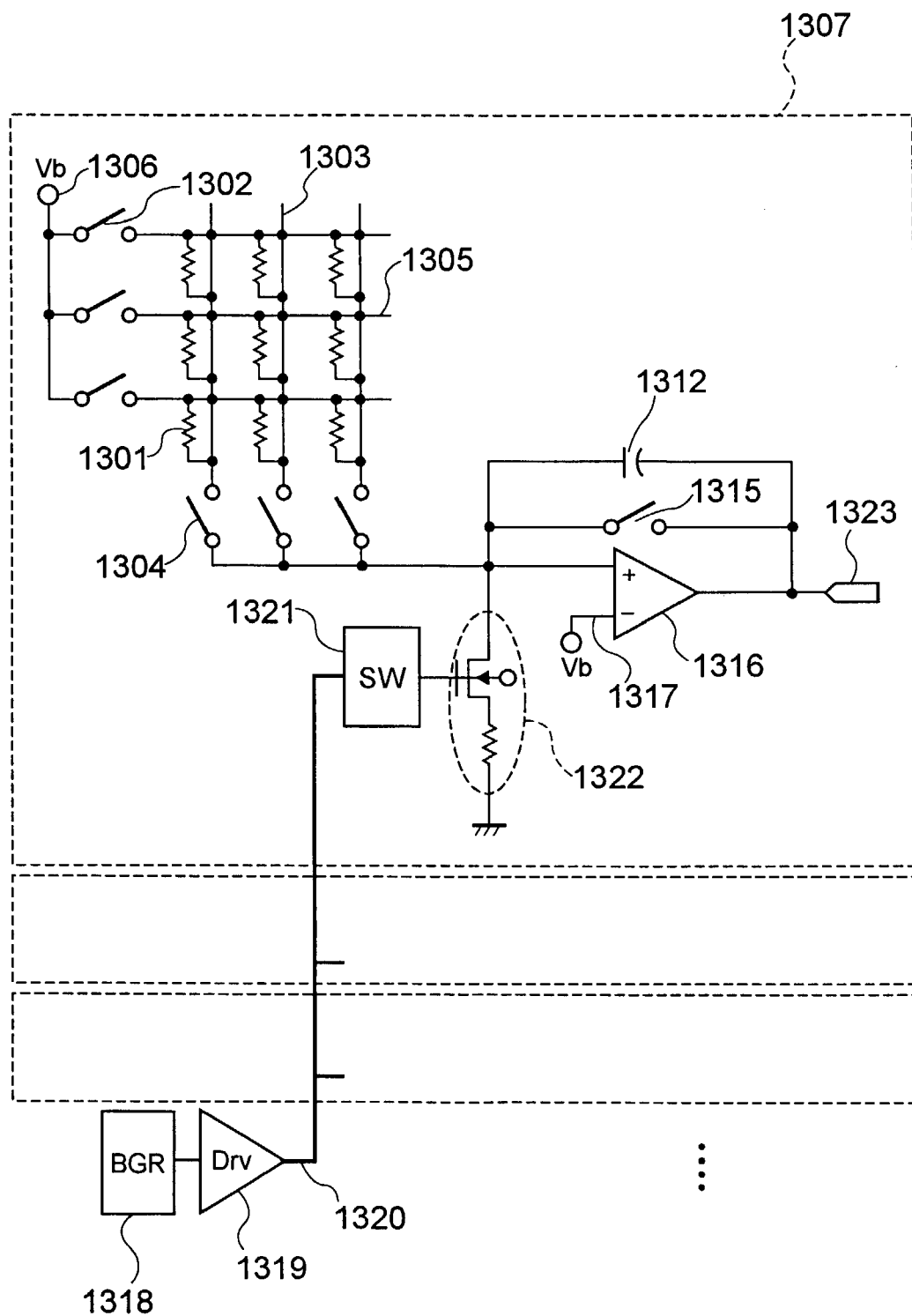
FIG. 13 illustrates a circuit configuration of a semiconductor apparatus according to a sixth embodiment of the present invention.

Next, a sixth embodiment of the present invention will be explained. FIG. 13 illustrates a configuration of an MRAM (magnetic memory, Magnetic-RAM) according to a sixth embodiment of the present invention. There is an MRAM reading system called "self-reference system (double reading)." This system reads unknown data first and retains the information. Then, known data (e.g., "1") is written, the information is read and the reading result of the unknown data is compared with the reading result of the known data.

TMR (tunnel magnetic resistor) elements 1301 are arranged two-dimensionally and a certain TMR element 1301 is selected by a word line 1305, a switch 1302, a bit line 1303 and a switch 1304.

A bias voltage 1306 is applied to the selected TMR element 1301 and a current flows therethrough. Double-reading allows a TMR element to operate though it has some resistance variations. However, with the progress of miniaturization, when resistance variations increase or when a signal is feeble and integrating gain needs to be increased, anti-variation measures are required as in the case of an infrared sensor.

The present invention is provided with a reference voltage source 1318, a multi-value voltage generator 1319, a multi-value voltage bus 1320, a group of switches 1321, a voltage/current conversion circuit 1322, and combines a correction current with a TMR element current.

In this example, one reading integrating circuit is provided for a plurality of TMR elements, and the plurality of TMR elements and the reading circuit form a bank 1307 and more than one bank exists. Each bank includes a group of switches 1321 and the multi-value voltage bus 1320 traverses each bank.

The content of variation correction varies depending on the extent of variations of TMR elements. When large variations among banks are corrected, there is a method which performs correction in such a way that an average of integrating currents of a plurality of TMR elements in a bank does not substantially change among different banks.

There is also a method for performing correction in such a way that an average of integrating currents of TMR elements in several units in a bank does not substantially change among different units.

There is also another method for performing correction in such a way that integrating currents of individual TMR elements substantially coincide with one another.

It is also possible to consider a method of storing not only information of "0" or "1" but also multi-value information in TMR elements. Since the present invention can increase the integrating gain, it is also possible to extract signals so far buried in noise and drastically increase a storage capacity through storage of multi-value information.

Variation correction data can be stored in TMR elements on the same chip and variation correction can be performed on a chip basis.

A phase change memory (Ovonic Unified Memory, also referred to as "OUM") just as MRAM is a memory to store information in a resistor and can read data in the same way as MRAM.

Seventh Embodiment

Figure 14:
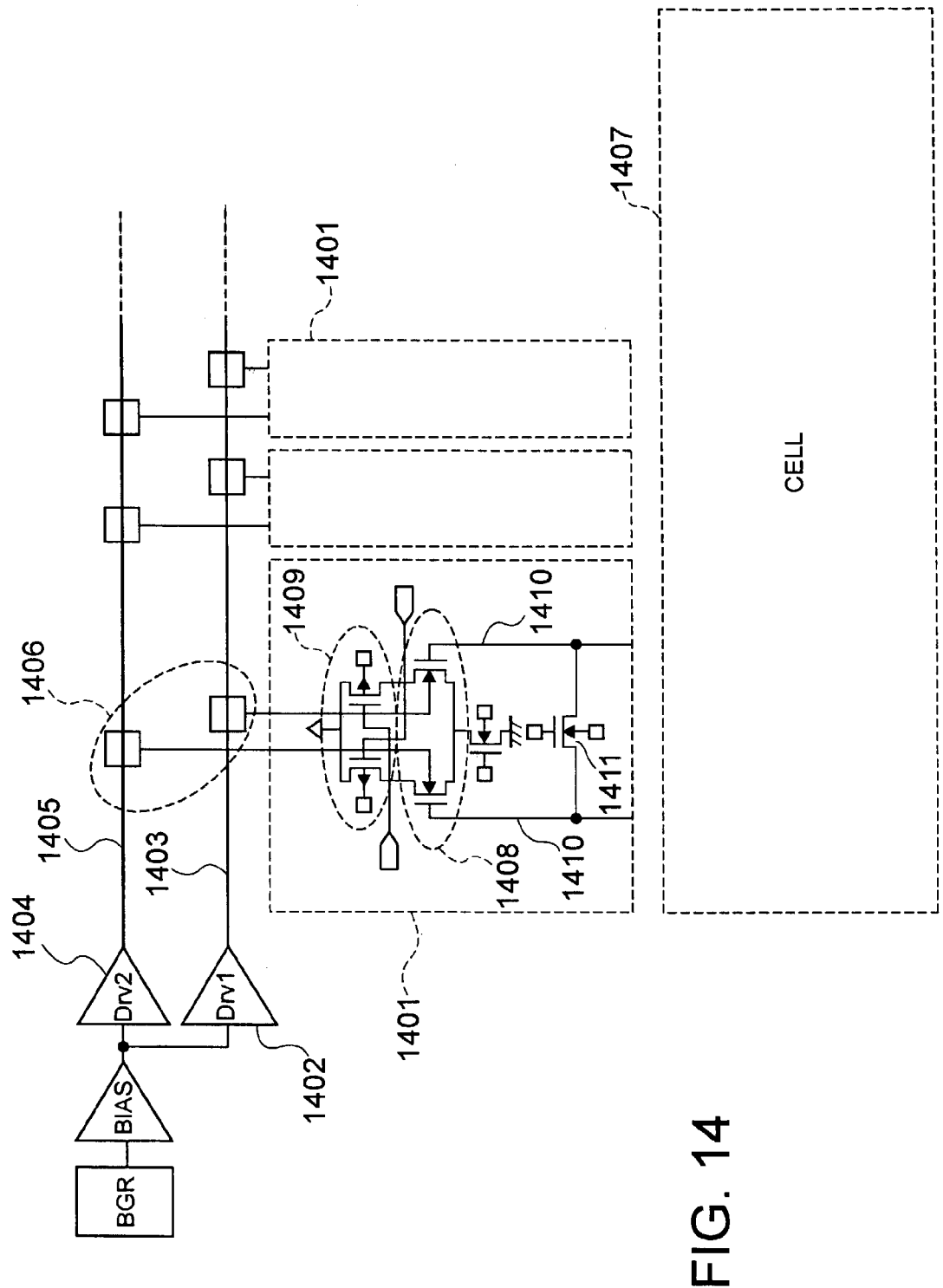
FIG. 14 illustrates another circuit configuration of the semiconductor apparatus according to the sixth embodiment of the present invention.

Next, a seventh embodiment of the present invention will be explained. FIG. 14 illustrates a configuration of a seventh embodiment which applies the present invention to a circuit using a plurality of sense amplifiers. According to FIG. 14, it is provided with a plurality of cells 1407, a plurality of sense amplifiers 1401 that read cell signals, a first multi-value voltage generator 1402, a first multi-value voltage bus 1403, a second multi-value voltage generator 1404, a second multi-value voltage bus 1405 and a group of switches 1406. The sense amplifiers 1401 are each provided with a pair of differential MOS transistors 1408, the sources of which are commonly connected to a constant current source and the gates of which are connected to a pair of bit lines, and a pair of transistors 1409 inserted between the drains of the pair of differential MOS transistors 1408 and a power supply for forming a current mirror and acting as an active load. A transistor 1411 between the bit lines 1410 is an equalizer to equalize the potentials of the pair of bit lines.

Signals from the multi-value voltage buses are connected to the sense amplifiers through the group of switches to correct variations of a plurality of sense amplifiers and variations of a plurality of cells.

As has been explained with the example of the infrared imaging device, the target of variation correction may be cells or sense amplifiers or both. The present invention allows influences of variation elements on the chip to be suppressed to a negligible level irrespective of locations where variations occur.

Voltages from the multi-value voltage buses are connected, for example, to the back gates of the pairs of differential transistors 1408 of the sense amplifiers through the switches. This allows the back gate voltages to be set arbitrarily according to variations, making it possible to change Vt of the two transistors making up the differential pair. This makes it possible not only to change variations of Vt of the transistors but also to correct offset variations which exist in the cells 1407. Control of the back gate voltages is applicable not only to the differential pairs but also to all transistors in the sense amplifiers and it is also possible to control, for example, the back gate voltages of the pairs of load transistors 1409 to correct various variations.

Moreover, it is also possible to correct variations by arbitrarily adding a current source and controlling the current source current using the multi-value voltage buses and group of switches. For example, it is possible to arbitrarily correct variations by changing the current that flows into the differential pairs using the current source current.

The sense amplifiers 1401 have latch type cross coupling, but can also be differential amplifiers with a power supply connected to the differential pairs depending on the material to be read, the system for reading, for example, multi-value logic or analog signal, or single-end amplifiers.

This embodiment has two systems made up of a multi-value voltage generator and multi-value voltage bus, which provides the effect of reducing correction residual with a smaller number of multi-value voltages and buses as explained in the infrared imaging element.

For example, the m multi-value voltages of the first system reduce variations to 1/m and the n multi-value voltages of the second system can reduce the variations to 1/n, and to $1/(m \times n)$ as total correction.

The number of systems is not limited to 1 or 2, but can be increased arbitrarily to thereby attain greater variation correction effects with fewer multi-value voltages.

Furthermore, as explained with the infrared imaging device, the present invention can also input time-varying voltages to the multi-value voltage generators, multi-value voltage buses and group of switches, and correct drifts of elements or change the settings of elements in real time according to variations in the environment.

As the cells, it is possible to use elements or circuits that handle certain functions such as various memories, sensors and transducers as electric signals. As such cells, various elements or circuits such as dynamic RAM (DRAM), static RAM (SRAM), ferroelectric memory (FeRAM), CCD image sensor or CMOS image sensor can be considered.

In the large trend of miniaturization, these elements and circuits are also subject to deterioration of uniformity due to limitations of machining precision or use of special materials, increase of variations due to the use of a polycrystalline structure or various variations such as quantal variations due to the lack of carriers themselves, and therefore the present invention is also applicable to these elements and circuits.

Eighth Embodiment

Figure 15A:
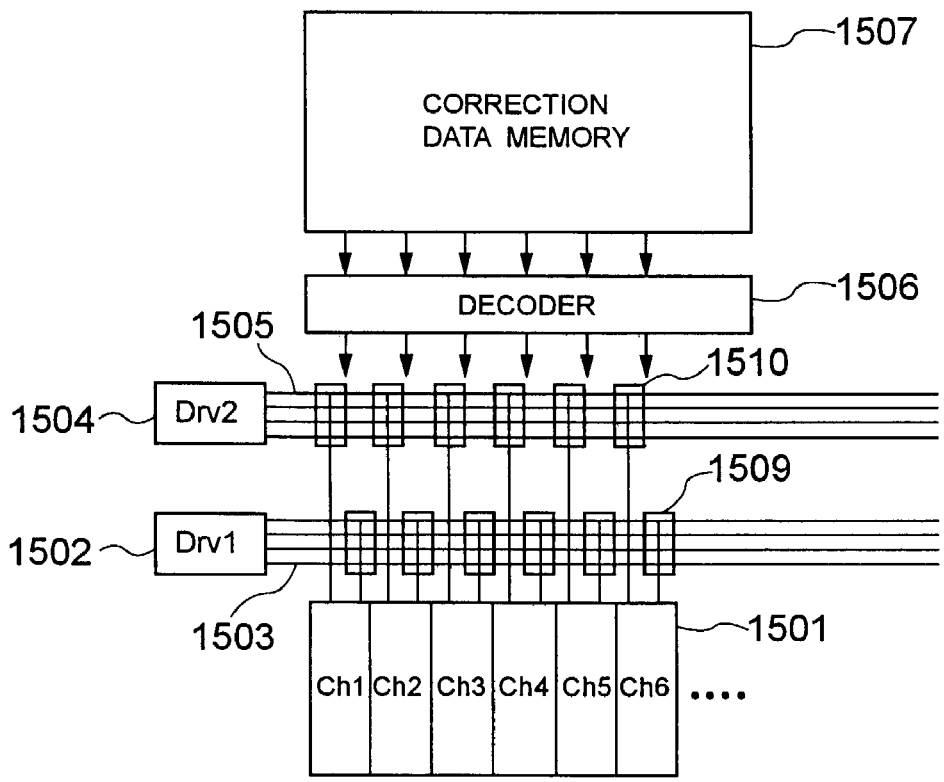
FIGS. 15A and 15B illustrate a circuit configuration of a semiconductor apparatus according to a seventh embodiment of the present invention.

Next, an eighth embodiment of the present invention will be explained. FIG. 15A illustrates a configuration of the eighth embodiment in which the present invention is applied to correct variations of the circuits. This embodiment is provided with a plurality of circuits 1501, a first multi-value voltage generator 1502, a first multi-value voltage bus 1503, a second multi-value voltage generator 1504, a second multi-value voltage bus 1505, a plurality of first switches 1509 and a plurality of second switches 1510. Signals from the first and second multi-value voltage buses 1503 and 1505 are connected to various circuits (Ch1 to Ch6, . . . ) in the circuits 1501 through the switches 1509 and 1510 to correct variations in a plurality of circuits.

As the various circuits 1501, a variety of circuits can be considered such as analog circuits handling analog signals such as reading circuits and various amplifiers, digital circuits handling digital signals such as AND, OR, gates such as flip flop, aggregate of gates, aggregate of gates and memories or circuits combining analog circuits and digital circuits. The present invention can suppress variations in each circuit to an ideal level.

The circuits 1501 are constructed of a plurality of circuits Cir1, Cir2, . . . . The plurality of circuits may be of the same circuit or different circuits. Against variations to be suppressed, the present invention can create a condition in which there are almost no such variations.

For example, when considerations are given to variations in threshold Vt or ON-current variations of a transistor in a digital circuit, these variations cause characteristics of the digital circuit such as the maximum operating frequency, delay time, jitter, skew, latency, drive performance, power consumption to differ from one circuit to another.

If the device principles, device structures or manufacturing processes are complete, that is, if there are no threshold Vt variations or ON-current variations, such characteristic variations will not be generated. That is, if Vt variations or ON-current variations are reduced by the present invention, variations in the characteristics are reduced to an ideal level.

In view of such an object, a plurality of circuits can be handled because of an excellent degree of freedom of the present invention no matter whether the plurality of circuits are of the same circuits, slightly different circuits or completely different circuits. Furthermore, the unit of circuits to be corrected can also be determined considering the fact that the scales of the group of switches 1509 and 1510 and decoder 1506 increase as the circuit unit to be corrected increases.

Among the characteristics described above, there are items that are preferred to be as small as possible such as power consumption or preferred to be as large as possible depending on the characteristics. These characteristics also have a trade-off relationship with other characteristics. For example, if the absolute value of the threshold voltage Vt increases, power consumption decreases. However, the circuit speed decreases.

In this case, it is essential to reduce Vt variations, and by doing so, variations in individual characteristics are reduced as a consequence.

Especially, threshold Vt and ON-current are basic parameters that represent various transistor characteristics and also basic parameters that affect the aforementioned various characteristics. For example, threshold voltage Vt and ON-current are determined by a gate length, gate width, thickness of gate oxide film, dielectric constant of oxide film or carrier mobility, etc., and affected by their variations. Furthermore, threshold vt and ON-current affect the speed, current consumption, logical threshold and current drive performance of a digital circuit, etc., or current consumption, dynamic range, noise, through rate, linearity, gain, unity gain frequency, input capacitance, band, cutoff frequency of an analog circuit, etc.

As a method for correcting these threshold Vt variations and ON-current variations, for example, it is possible to consider a configuration of controlling effective Vt during operation by applying a selected multi-value voltage to back gates of transistors as described above. By controlling the effective threshold Vt, it is also possible to control an ON-current.

Correction data may be stored inside or outside the chip.

Figure 15B:
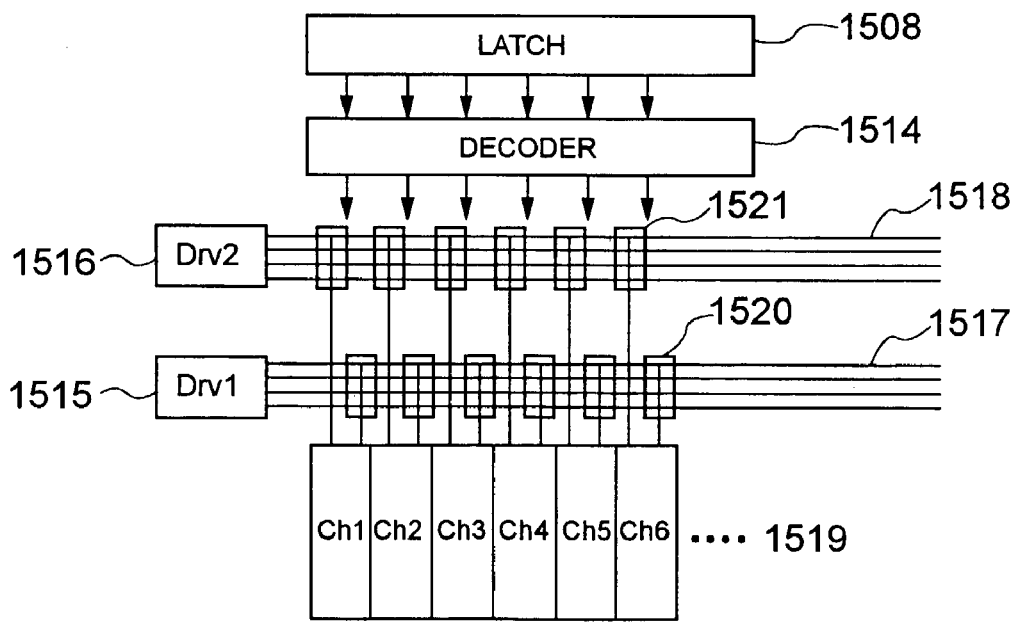

As shown in FIG. 15A, the correction data memory 1507 may be located on the same chip as that of the circuits 1501 or the correction system. Or as shown in FIG. 15B, a latch 1508 may be provided on the chip so that the correction data is loaded to the latch 1508 from outside the chip as required. In the configuration shown in FIG. 15B, first and second multi-value voltage generators 1515 and 1516, first and second multi-value voltage buses 1517 and 1518, and first and second switches 1520 and 1521 are provided, and switches 1520 and 1521 select one of a plurality of voltages based on signals from a decoder 1514 and output it to one of corresponding circuits 1519 (Ch1 to Ch6, . . . ).

Having correction data inside the chip naturally has not only the merit of reducing the size of the system but also the advantage of speeding up the setting of correction data or increasing the degree of freedom in the setting of correction data. Having correction data outside the chip, for example, changing the correction data according to instructions from a CPU (not shown) increases the degree of freedom in correcting drifts or changing the setting according to variations in the environment, etc.

Ninth Embodiment

Figure 16:
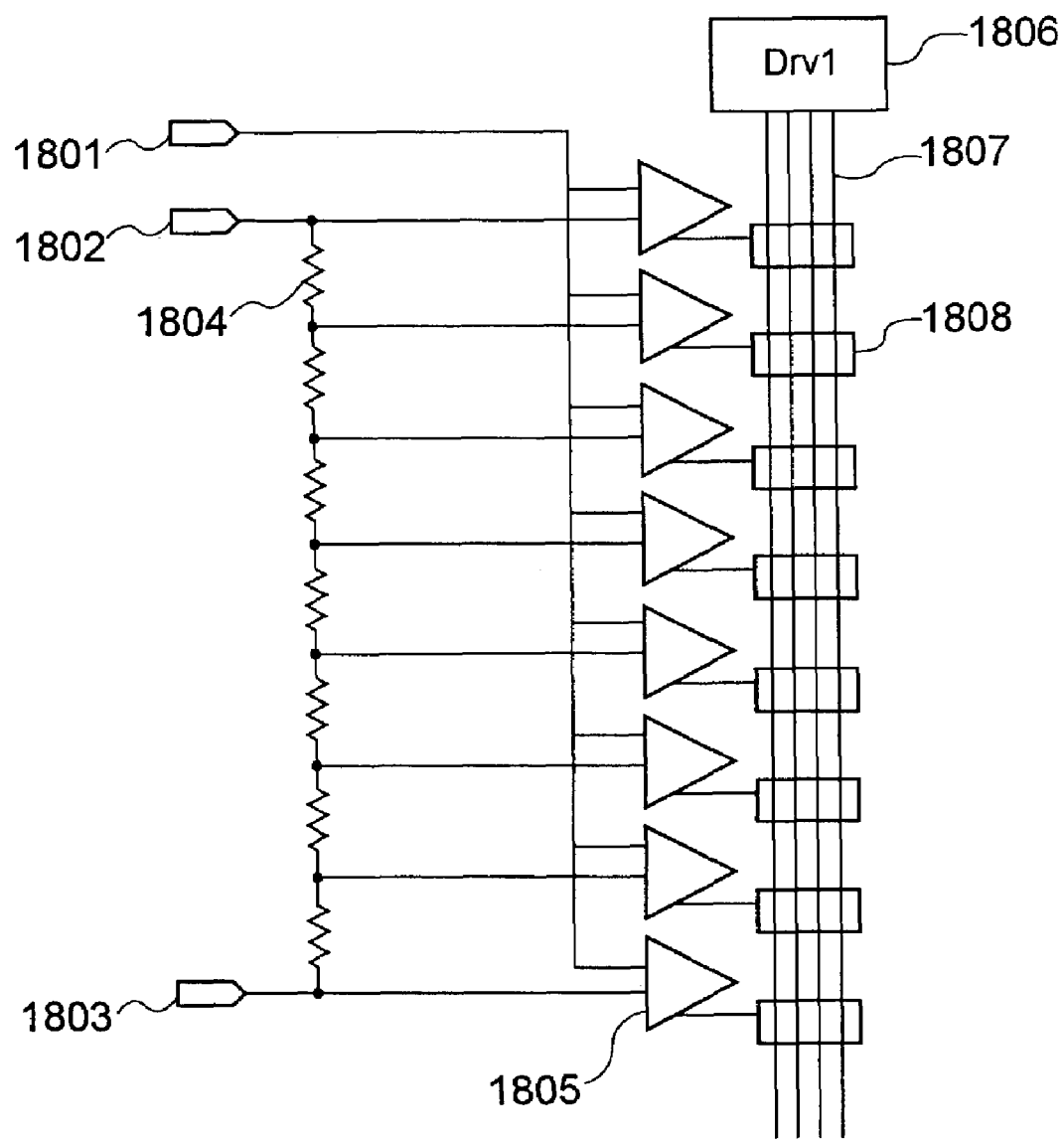
FIG. 16 illustrates a configuration according to a ninth embodiment of the present invention.

Next, a ninth embodiment of the present invention will be explained. FIG. 16 shows the ninth embodiment in which the present invention is applied to a configuration with many comparators and operational amplifiers placed in a line, for example, flash type (parallel type) A/D converters. It has a plurality of comparators 1805, a multi-value voltage generator 1806, multi-value voltage buses 1807 and switches 1808. The comparators 1805 may also be operational amplifiers.

Normally each comparator has an offset voltage and the offset voltage varies from one comparator to another. Variations in the offset voltage are generated mainly by variations in a threshold voltage Vt between transistors in the comparator.

As in the case of the aforementioned embodiment, this embodiment operates the switches 1808 and selects one analog voltage out of multi-value voltages so that variations in the offset voltage among a plurality of comparators are eliminated, that is, offset voltages are concentrated on a certain voltage.

Furthermore, a case where this embodiment is applied to an A/D converter will be considered. An input voltage 1801 is compared with a plurality of voltages generated at their resistor ends of the resistor array 1804 and a conversion result of thermometer codes is output.

A reference voltage necessary for the conversion is applied to the terminal 1802 and terminal 1803 and a voltage obtained by dividing the reference voltage appears at each terminal of the resistor array 1804.

In the parallel type A/D converter, this divided voltage and input voltage 1801 are compared by a plurality of comparators 1805.

Elements affecting DNL (differential linearity error) or INL (integral linearity error) of the A/D converter are main variations in the offset of the aforementioned comparators and variations among the resistors of the resistor array 1804, but as variation factors, variations in wiring resistance and parasitic capacitance, variations of offset voltage of the operational amplifier due to a temperature distribution on a chip and variations of gate length and wiring width due to micro-loading effects of etching are also involved.

In this embodiment, the switches 1808 are selected so that DNL and INL become a minimum. As a consequence, this means that comprehensive correction is carried out on characteristics in which a plurality of variation factors are mixed and affect the conversion results.

One of the multi-value voltages selected by the switches 1808 is connected, for example, to the back gates of the differential stage transistor of the comparator. This causes Vt of the differential stage transistor to change and the offset voltage of the comparator to change.

As the procedure for correction, for example, only the MSBs of all the switches 1808 next to the respective comparators are set to ON and a known voltage is applied to the input voltage 1801. In this condition, original variations occur, causing great DNL and INL.

It is possible to perform correction by changing the settings of the switches 1808 of the comparators which take charge of conversion locations with large DNL and INL so as to minimize the DNL and INL. As the correction procedure, the technique of a bifurcated search explained in FIG. 4 can be used, too.

Tenth Embodiment

Figure 17:
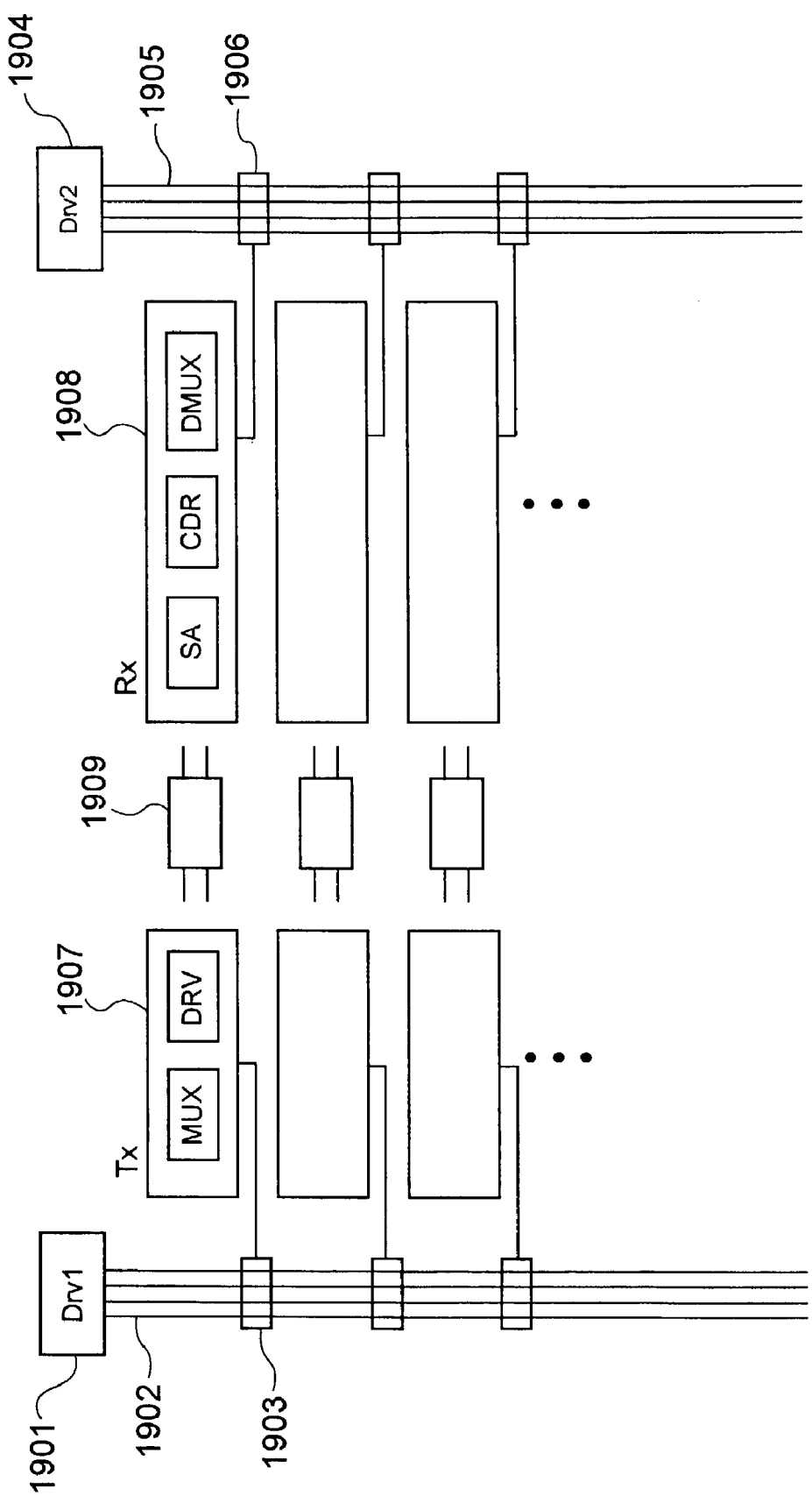
FIG. 17 illustrates a configuration according to a tenth embodiment of the present invention.

Next, a tenth embodiment of the present invention will be explained. FIG. 17 illustrates a configuration of the tenth embodiment of the present invention in which the present invention is used for a serial communication circuit. According to FIG. 17, a transmission circuit 1907 in serial communication consists of a multiplexer MUX that converts multi-bit digital signals to 1-bit serial data and a driver DRV to drive a transmission line 1909, etc.

A reception circuit 1908 consists of a sense amplifier SA to shape a signal waveform that has passed through the transmission line 1909, a clock data recovery CDR that restores a waveform whose phase, etc., has been deformed to its original shape and a demultiplexer DMUX that converts the 1-bit serial data to multi-bit data, etc. Serial communication circuits in recent years improve transmission rates by forming a plurality of pairs of transmission/reception blocks on the same chip.

In a serial communication having such a plurality of pairs of transmission/reception blocks, the performance of the transmission rate may be determined depending on the accuracy of synchronization of timings among blocks. For example, if there is a time difference among signals coming out of the reception block, it is necessary to determine the timing of the subsequent processing so as to absorb the time difference, which is linked to a processing delay.

This embodiment provides correction in such a way as to eliminate variations in delays between the blocks by placing the multi-value voltage generator 1904, multi-value voltage buses 1905 and switches 1906, for example, in a plurality of reception blocks.

For example, by connecting one of the multi-value voltages from the switches 1906 to the back gate of a transistor, it is possible to convert a threshold Vt of the transistor and change the switching speed of the transistor.

Based on such a principle, signal output timing of each reception block is adjusted to be substantially constant. This also has the effect of controlling so-called jitter of the signal.

The method of changing the switching speed is not limited to this method, but a plurality of methods are available and this embodiment keeps variations in the time delay between blocks substantially constant using the multi-value voltage bus technology, and can thereby improve the performance as serial communication.

It is also possible to provide correction using multi-value voltage buses for the transmission circuit in order to correct signal output timings between blocks and the circuit made up of the multi-value voltage generator 1901, multi-value voltage buses 1902 and switches 1903 can perform the same correction as that carried out on the receiving side on the transmission block 1907.

Eleventh Embodiment

Figure 18:
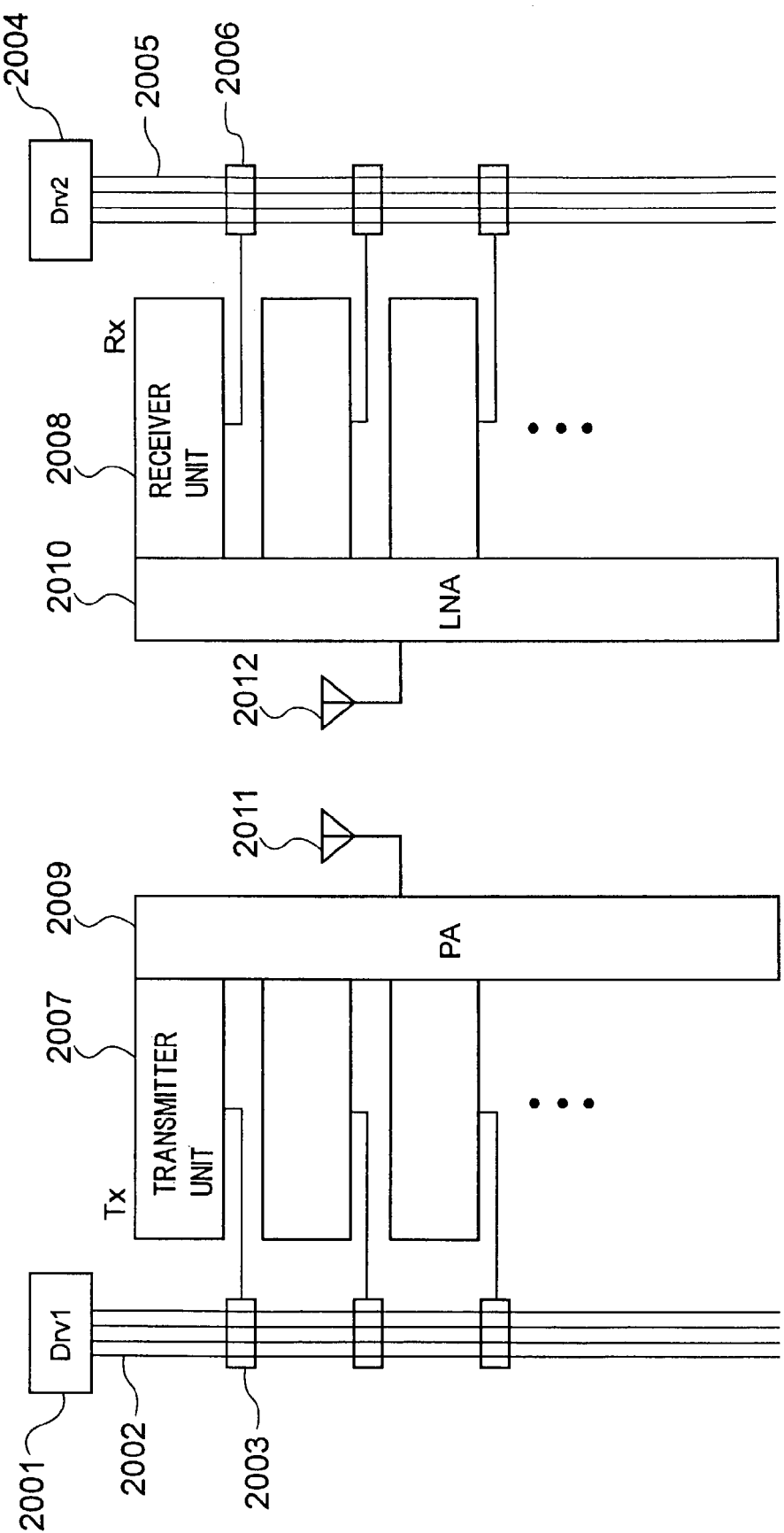
FIG. 18 illustrates a configuration according to an eleventh embodiment of the present invention.
Figure 19:
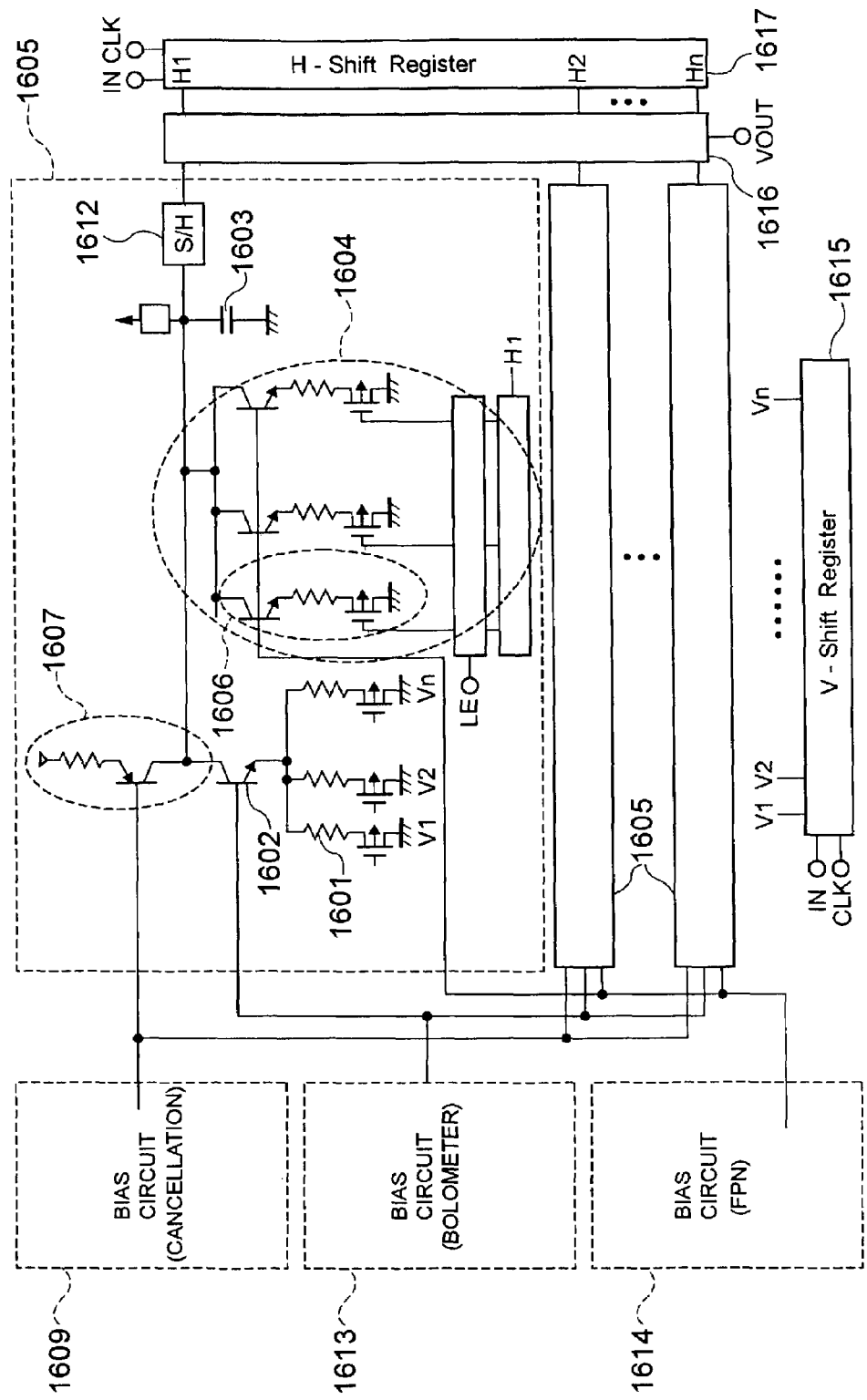
FIG. 19 illustrates a circuit configuration of a conventional semiconductor apparatus.
Figure 20:
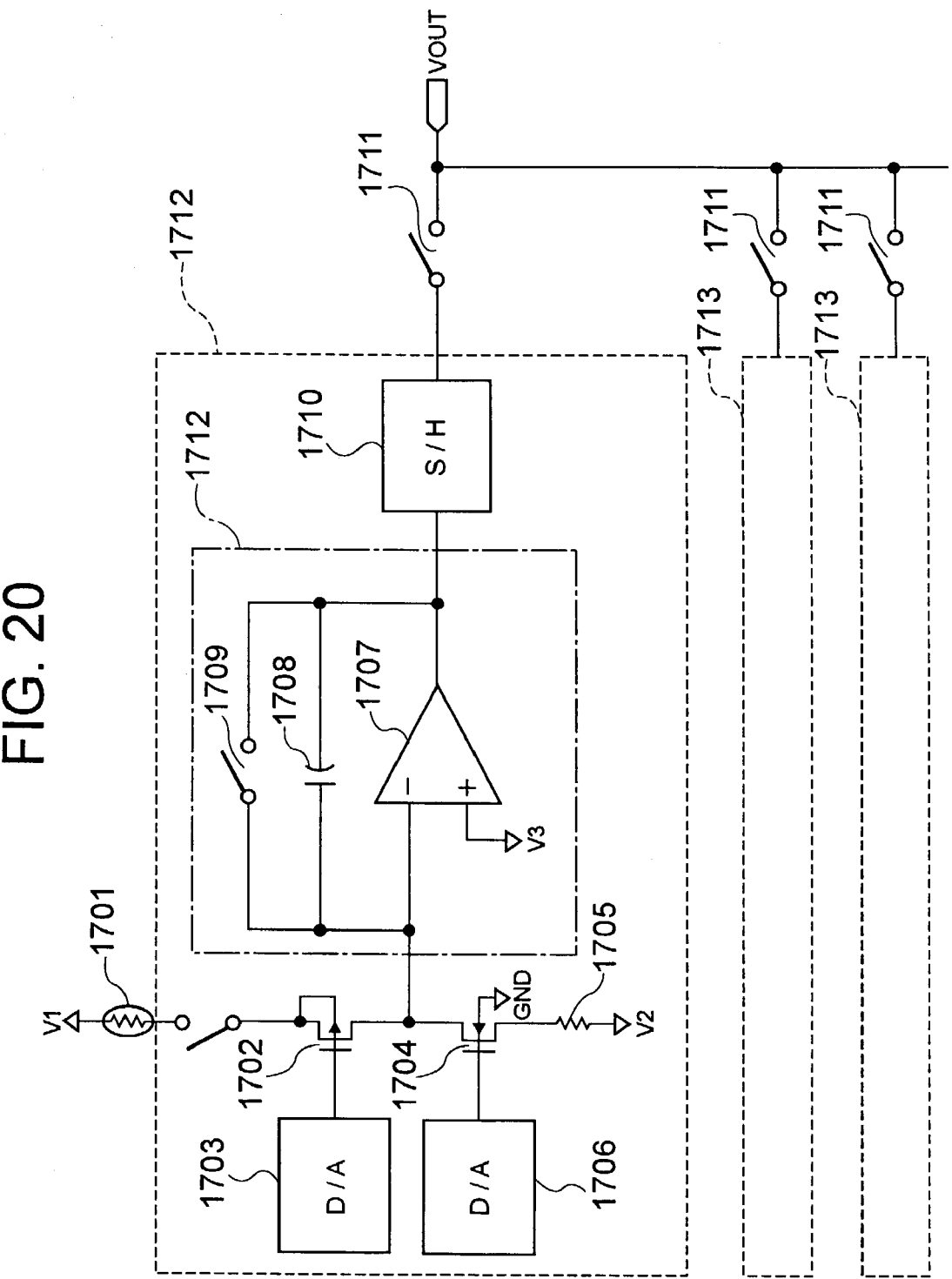
FIG. 20 illustrates another circuit configuration of the conventional semiconductor apparatus.

Next an eleventh embodiment of the present invention will be explained. FIG. 18 illustrates a block configuration according to the eleventh embodiment in which the present invention is applied to a wireless communication circuit. According to FIG. 18, a plurality of transmitter units 2007 are provided on the same chip and connected to an antenna 2011 through a power amplifier (transmission power amplification circuit) 2009. Only one power amplifier 2009 is illustrated, but one power amplifier 2009 can be provided for each transmitter unit.

Thus, the significance of providing a plurality of transmitter units on the same chip is to combine transmitter units with different wireless systems, multiplex frequencies represented by OFDM (Orthogonal Frequency Division Multiplexing) or cover a wide band in impulse wireless communication with an extremely wide band.

A plurality of receiver units 2008 are connected to an antenna 2012 through a low noise amplifier (LNA) 2010. The low noise amplifier 2010 may also be provided for each receiver unit.

The purpose of using a plurality of receiver units is the same as that of the transmitter units and architecture of such a concept is also used in the case of a so-called finger circuit of a RAKE receiver used to improve multipaths through path diversity control.

In such a wireless transmission circuit or wireless reception circuit, jitter of phase, variations in delays of output signals may determine the system performance.

Especially, a tiny variation of the transmitter in a wireless circuit can often cause low frequency beat noise. The circuit to be corrected can be any unit or block in the transmission/reception circuit.

The present invention suppresses variations among units and improves the system performance. For example, the RAKE reception circuit is a circuit that adjusts timing of radio wave arriving with a time delay due to multipaths so that the radio wave restores its original state and adjusting variations in delays of output signals among finger units improves the accuracy of the combination processing.

So far, the present invention has been explained according to various embodiments, but the present invention is not limited to the configurations of the above-described embodiments and it goes without saying that it includes various transformations or modifications that could be done by those skilled in the art within the scope of the present invention described in claims thereof.

As has been explained, the present invention has the following effects:

A first effect of the present invention is the ability to correct variations in a resistor or capacitor, inductor, transistor diode, wiring., process, device principles, device structure, etc., and directly or indirectly reduce characteristic variations such as offset, sensitivity, maximum operation frequency, delay time, jitter, skew, latency, drive performance, power consumption, etc., in analog and digital circuits caused by these variations.

A second effect of the present invention is that the configuration made up of the multi-value voltage generator, multi-value voltage bus and group of switches requires the respective sections to be corrected to provide not more than the group of switches and requires only a small circuit scale, circuit area or a small amount of power consumption for corrections.

A third effect of the present invention is the ability to suppress noise generated at the multi-value voltage generator to a smallest possible level and reduce overall noise.

A fourth effect of the present invention is the ability to perform time-varying corrections through the configuration made up of the multi-value voltage generator, multi-value voltage bus and group of switches, thus improving the degree of freedom (design flexibility, margin) such as drift corrections and settings according to variations in the environment.

A fifth effect of the present invention is the ability to have a plurality of systems consisting of multi-value voltage generators and multi-value voltage buses and attain high accuracy of correction with small multi-value voltages and a small number of buses.

A sixth effect of the present invention is the ability to increase the dynamic range of, for example, the analog circuit through reduction of variations and improve sensitivity and S/N of the circuits. Furthermore, reducing jitter of digital circuits allows the digital circuits to operate faster and improve throughput per unit power consumption because there is no need to depend on the increase of drive performance of transistors.

A seventh effect of the present invention is that the configuration made up of multi-value voltage generators, multi-value voltage buses and a group of switches provides flexibility in the setting of a voltage span and setting of offsets of multi-value voltages, capable of responding to all kinds of circuits, operations and settings.

What is claimed is:

1. A semiconductor apparatus comprising:
   a resistor array made up of a plurality of resistors;
   a plurality of reading circuits that read variations in resistance of said resistor array;
   a first multi-value voltage bus that supplies a plurality of analog voltages to each of said plurality of reading circuits; and
   a first multi-value voltage generation circuit that supplies a plurality of mutually different analog voltages to a plurality of lines constituting said first multi-value voltage bus,
   wherein said plurality of reading circuits each comprises a first switch for selecting one analog voltage out of said plurality of analog voltages from said first multi-value voltage bus.

2. The semiconductor apparatus according to claim 1, wherein said semiconductor apparatus comprises a plurality of sets of systems made up of said first multi-value voltage generation circuit, said first multi-value voltage bus and said first switch.

3. The semiconductor apparatus according to claim 1, wherein said reading circuits further comprise a first transistor that passes a first current determined by the resistance of said resistor array and one of said plurality of analog voltages.

4. The semiconductor apparatus according to claim 3, wherein said reading circuits passes said first current through a capacitor and outputs a reading result based on the terminal voltage of said capacitor.

5. The semiconductor apparatus according to claim 1, wherein said reading circuits comprises a decoder for controlling the selection of the analog voltage by said first switch.

6. The semiconductor apparatus according to claim 1, wherein said first multi-value voltage generation circuit comprises:
 a first amplifier that amplifies an input reference voltage with a first gain;
 a second amplifier that amplifies said reference voltage with a second gain; and
 a plurality of resistors connected in series between the output terminals of said first and second amplifiers, and
 a plurality of different output voltages are extracted from a plurality of taps made up of connection points between the output terminals of said first and second amplifiers and said plurality of resistors connected between the output terminals of said first and second amplifiers.

7. The semiconductor apparatus according to claim 1, wherein at least one of said plurality of analog voltages is a plurality of time-varying analog voltages.

8. The semiconductor apparatus according to claim 1, wherein said reading circuit comprises:
 an integrating circuit that inputs the current passing through said resistor array, integrates the current and outputs the integration result;
 a first operational amplifier, the non-inverting input terminal of which is connected to the output terminal of said first switch and the inverting input terminal of which is connected to one end of said resistor array;
 a first transistor connected between one end of said resistor array and the input terminal of said integrating circuit for receiving the output voltage from the output terminal of said first operational amplifier as a bias voltage to a control terminal.

9. The semiconductor apparatus according to claim 1, further comprising a second multi-value voltage generation circuit that supplies a plurality of mutually different analog voltages to a plurality of lines making up a second multi-value voltage bus,
 wherein said reading circuit comprises:
 an integrating circuit that inputs the current passing through said resistor array, integrates the current and outputs the integration result;
 a first operational amplifier, the non-inverting input terminal of which is connected to the output terminal of said first switch and the inverting input terminal of which is connected to one end of said resistor array;
 a first transistor connected between one end of said resistor array and the input terminal of said integrating circuit for receiving the output voltage from the output terminal of said first operational amplifier as a bias voltage to a control terminal;
 a second switch that inputs a plurality of mutually different voltages output from said second multi-value voltage circuit to said second multi-value voltage bus, selects and outputs one of the voltages;
 a second resistor, one end of which is connected to a second power supply;
 a second operational amplifier, the non-inverting input terminal of which is connected to the output terminal of said second switch and the inverting input terminal of which is connected to the other end of said second resistor; and
 a second transistor connected between the other end of said second resistor and the input terminal of said integrating circuit for receiving the output voltage from the output terminal of said second operational amplifier as a bias voltage to the control terminal.

10. A semiconductor apparatus comprising:
 a multi-value voltage generation circuit that generates a plurality of mutually different analog voltages;
 a multi-value voltage bus that distributes said plurality of analog voltages output from said multi-value voltage generating means into the chip;
 a plurality of switches that receive a plurality of analog voltages from said multi-value voltage bus and selects one of said plurality of analog voltages; and
 a plurality of circuits supplied with the analog voltages selected by a plurality of said switches.

11. The semiconductor apparatus according to claim 10, wherein one of said plurality of switches selects one of the analog voltages of said multi-value voltage bus and supplies said analog voltage to one of said plurality of circuits and said switch is provided for each of said plurality of circuits.

12. The semiconductor apparatus according to claim 10, comprising a plurality of sets of systems made up of said multi-value voltage generation circuit and multi-value voltage bus that distributes said plurality of analog voltages output from said multi-value voltage generation circuit into the chip, wherein one of said circuits is provided with a plurality of said switches in a one-to-one correspondence with a plurality of systems of said multi-value voltage buses and a plurality of sets of analog voltages selected by said plurality of switches are supplied to said one circuit.

13. A semiconductor apparatus comprising a reading circuit that reads a current passing through a first resistor, one end of which is connected to a first power supply during a current read,
 wherein said reading circuit comprises:
 an integrating circuit that inputs the current passing through said first resistor, integrates the current and outputs the integration result;
 a first switch that receives a plurality of mutually different voltages supplied from a first multi-value voltage generation circuit provided outside said reading circuit, selects and outputs one of the voltages;
 a first operational amplifier, the non-inverting input terminal of which receives the output voltage of said first switch and the inverting input terminal of which is connected to the other end of said first resistor; and
 a first transistor connected between the other end of said first resistor and the input terminal of said integrating circuit for receiving the output voltage from the output terminal of said first operational amplifier as a bias voltage to a control terminal.

14. The semiconductor apparatus according to claim 13, wherein said reading circuit comprises:
 a second switch that receives a plurality of mutually different voltages supplied from a second multi-value voltage generation circuit provided outside said reading circuit and selects and outputs one of the voltages;
 a second operational amplifier, the non-inverting input terminal of which receives the output voltage of said second switch and the inverting input terminal of which is connected to the other end of said resistor element;
 a second resistor, one end of which is connected to a second power supply; and
 a second transistor connected between the other end of said second resistor and the input terminal of said integrating circuit for receiving the output voltage of the output terminal of said second operational amplifier as a bias voltage to the control terminal.

15. The semiconductor apparatus according to claim 14, wherein said second multi-value voltage generation circuit comprises:
a circuit that outputs two mutually different voltages from the third and fourth voltage terminals based on the input reference voltage; and
a plurality of resistors connected in series between said third and fourth voltage terminals, and
voltages from a plurality of taps made up of connection points between said third and fourth voltage terminals and said resistors are supplied to said second switch as a plurality of mutually different voltages.

16. The semiconductor apparatus according to claim 15, wherein the circuit of said second multi-value voltage generation circuit that outputs said two mutually different voltages from the third and fourth voltage terminals, comprises:
a third driver circuit that outputs a voltage obtained by amplifying the input reference voltage with a third gain from said third voltage terminal; and
a fourth driver circuit that outputs a voltage obtained by amplifying the input reference voltage with a fourth gain from said fourth voltage terminal.

17. The semiconductor apparatus according to claim 14, wherein said reading circuit comprises a decoder that controls the selection of said second switch based on an input control signal.

18. The semiconductor apparatus according to claim 14, wherein one said second multi-value voltage generation circuit is provided for a plurality of said reading circuits.

19. The semiconductor apparatus according to claim 13, wherein said first multi-value voltage generation circuit comprises:
a circuit that outputs two mutually different voltages from the first and second voltage terminals based on an input reference voltage; and
a plurality of resistors connected in series between said first and second voltage terminals, and
voltages from a plurality of taps made up of connection points between said first and second voltage terminals and said plurality of resistors are supplied to said first switch as a plurality of mutually different voltages.

20. The semiconductor apparatus according to claim 19, wherein the circuit of said first multi-value voltage generation circuit that outputs said two mutually different voltages from the first and second voltage terminals, comprises:
a first driver circuit that outputs a voltage obtained by amplifying the input reference voltage with a first gain from said first voltage terminal; and
a second driver circuit that outputs a voltage obtained by amplifying the input reference voltage with the first gain from said second voltage terminal.

21. The semiconductor apparatus according to claim 13, wherein said reading circuit is provided with a decoder that controls the selection of said first switch based on an input control signal.

22. The semiconductor apparatus according to claim 13, wherein one said first multi-value voltage generation circuit is provided for a plurality of said reading circuits.

23. A semiconductor apparatus comprising:
a plurality of multi-value voltage generation circuits that output mutually different voltages to a bus consisting of a plurality of lines; and
a switch connected to said bus for receiving a control signal from a decoder and selecting and outputting any one line of said bus,
wherein the output voltage of said switch is supplied to a target circuit.

* * * * *

UNITED STATES PATENT AND TRADEMARK OFFICE
CERTIFICATE OF CORRECTION

| | |
|---|---|
| PATENT NO. | : 7,642,620 B2 |
| APPLICATION NO. | : 10/459524 |
| DATED | : January 5, 2010 |
| INVENTOR(S) | : Akio Tanaka |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1972 days.

Signed and Sealed this

Twenty-first Day of December, 2010

David J. Kappos
*Director of the United States Patent and Trademark Office*